(12) United States Patent
Baghdasarian

(10) Patent No.: US 9,004,409 B1
(45) Date of Patent: Apr. 14, 2015

(54) EXTENDABLE ANTENNA REFLECTOR DEPLOYMENT TECHNIQUES

(75) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 753 days.

(21) Appl. No.: 13/215,929

(22) Filed: Aug. 23, 2011

(51) Int. Cl.
*B64G 1/22* (2006.01)

(52) U.S. Cl.
CPC ........................................ *B64G 1/22* (2013.01)

(58) Field of Classification Search
USPC ................................. 244/172.6, 173.3, 159.5
See application file for complete search history.

(56) References Cited

U.S. PATENT DOCUMENTS

| | | | |
|---|---|---|---|
| 3,576,566 A | | 4/1971 | Cover et al. |
| 3,652,042 A | * | 3/1972 | Welther ...................... 244/173.3 |
| 4,380,013 A | * | 4/1983 | Slysh ............................ 343/753 |
| 4,480,415 A | * | 11/1984 | Truss ............................... 52/108 |
| 4,561,614 A | * | 12/1985 | Olikara et al. ............. 244/172.6 |
| 4,587,777 A | * | 5/1986 | Vasques et al. ................. 52/108 |
| 4,634,086 A | | 1/1987 | Mori |
| 4,725,025 A | * | 2/1988 | Binge et al. ................ 244/172.6 |
| 5,129,601 A | * | 7/1992 | Henkel ........................ 244/173.3 |
| 5,253,827 A | * | 10/1993 | Funk et al. ................. 244/173.3 |
| 5,527,001 A | * | 6/1996 | Stuart ......................... 244/159.4 |
| 5,833,175 A | | 11/1998 | Caplin |
| 5,963,182 A | | 10/1999 | Bassily |
| 5,969,695 A | | 10/1999 | Bassily et al. |
| 5,996,940 A | | 12/1999 | McVey et al. |
| 6,384,800 B1 | | 5/2002 | Bassily et al. |
| 6,424,314 B1 | | 7/2002 | Baghdasarian et al. |
| 6,448,940 B1 | | 9/2002 | Chiang |
| 6,669,147 B2 | | 12/2003 | Bertheux et al. |
| 6,768,582 B1 | * | 7/2004 | Hachkowski et al. ........ 359/399 |
| 7,104,506 B1 | | 9/2006 | Goodzeit et al. |
| 7,180,470 B1 | | 2/2007 | Hentosh |
| 7,602,349 B2 | * | 10/2009 | Hentosh et al. ............... 343/882 |
| 7,714,797 B2 | * | 5/2010 | Couchman et al. ........... 343/881 |
| 8,448,902 B2 | | 5/2013 | Gelon |
| 8,496,209 B2 | * | 7/2013 | Chaix et al. ................. 244/172.6 |
| 2002/0145082 A1 | | 10/2002 | Bertheux et al. |
| 2003/0057328 A1 | | 3/2003 | Maruno et al. |
| 2008/0111031 A1 | | 5/2008 | Mobrem |

(Continued)

FOREIGN PATENT DOCUMENTS

| | | |
|---|---|---|
| EP | 780294 | 6/1997 |
| FR | 2476018 | 8/1981 |

(Continued)

OTHER PUBLICATIONS

U.S. Appl. No. 61/383,672, filed Sep. 16, 2010, entitled "High Capacity Broadband Satellite", by Walter Gelon et al.

(Continued)

*Primary Examiner* — Tien Dinh
*Assistant Examiner* — Keith L Dixon
(74) *Attorney, Agent, or Firm* — Weaver Austin Villeneuve & Sampson

(57) ABSTRACT

A high capacity satellite having a launch configuration in which one or more antenna reflectors may be stored forward of a forward surface of the spacecraft and an on-orbit configuration in which a reflector boom may be extended forward and rotated to place the one or more antenna reflectors outboard of the spacecraft main body and further forward of the forward surface of the spacecraft.

30 Claims, 15 Drawing Sheets

(56) References Cited

U.S. PATENT DOCUMENTS

2008/0143636 A1 6/2008 Couchman et al.
2012/0068019 A1 3/2012 Boccio

FOREIGN PATENT DOCUMENTS

| FR | 2522614 | 9/1983 |
| JP | 10209747 | 8/1998 |
| RU | 2092398 | 10/1997 |

OTHER PUBLICATIONS

U.S. Appl. No. 13/101,944, filed May 5, 2011, entitled "High Capacity Broadband Satellite", by Joel Francis Boccio et al.

U.S. Appl. No. 13/026,175, filed Feb. 11, 2011, entitled "Satellite Having Multiple Aspect Ratios," by Walter Gelon.

U.S. Appl. No. 13/215,932, filed Aug. 23, 2011, entitled "Reflector Deployment Techniques for Satellites," by Varouj G. Baghdasarian et al.

U.S. Office Action in U.S. Appl. No. 13/101,944 dated Dec. 31, 2012.
U.S. Final Office Action in U.S. Appl. No. 13/101,944 dated Apr. 11, 2013.
U.S. Office Action in U.S. Appl. No. 13/101,944 dated Aug. 30, 2013.
U.S. Office Action in U.S. Appl. No. 13/026,175 dated Oct. 11, 2012.
U.S. Notice of Allowance in U.S. Appl. No. 13/026,175 dated Feb. 20, 2013.
U.S. Office Action in U.S. Appl. No. 13/215,932 dated Feb. 10, 2014.
PCT International Search Report and Written Opinion dated Dec. 29, 2011 issued in PCT/US2011/049183.
PCT International Preliminary Report on Patentability dated Mar. 28, 2013 issued in PCT/US2011/049183.
PCT International Search Report and Written Opinion dated Jan. 17, 2012 issued in PCT/US2011/049190.
PCT International Preliminary Report on Patentability dated Aug. 22, 2013 issued in PCT/US2011/049190.
Persinger et al. "The Intelsat V1 Antenna System" Comsat Technical Review, Communications Satellite Corporation, vol. 21, No. 1, Mar. 1, 1991, pp. 149-187.
Wilson et al. "Future Radiometer Systems for Earth Remote Sensing" Microwave Symposium Digest, 1999 IEEE MTT-S Jun. 13, 1999 pp. 395-398.

* cited by examiner

EXTENDABLE ANTENNA REFLECTOR DEPLOYMENT TECHNIQUES

TECHNICAL FIELD

This invention relates generally to a spacecraft providing communications and/or broadcast service, and particularly to antenna reflector packaging and deployment techniques for such a spacecraft.

BACKGROUND OF THE INVENTION

The assignee of the present invention manufactures and deploys spacecraft for, inter alia, communications and broadcast services. Market demands for such spacecraft have imposed increasingly stringent requirements on spacecraft payload operational capacity. For example, rigid antenna reflector systems characterized by large reflector apertures and long focal lengths are increasingly needed to improve payload operational capacity.

Launch vehicle compatibility is a second requirement faced by a spacecraft designer. The increased performance requirements are only advantageously met if compatibility with conventional, commercially available launch vehicles is maintained. Accordingly, a spacecraft, as configured for launch, is desirably made compatible with the mass and fairing envelope constraints of such launch vehicles as, for example, Ariane V, Atlas XEPF, Proton, and Sea Launch. Commonly-assigned patent application Ser. No. 13/101,944, titled "High Capacity Broadband Satellite", and Ser. No. 13/026,175, titled "Satellite Having Multiple Aspect Ratios," disclose additional information regarding the above-mentioned problems, and are hereby incorporated by reference in their entireties.

In view of the foregoing, there is a need for a spacecraft capable of supporting higher-gain rigid antenna reflector systems while still fitting within the fairing envelopes of existing launch vehicles.

SUMMARY OF INVENTION

The present inventor has appreciated that a rigid antenna reflector having a large focal length may be packaged on a spacecraft within a conventional launch vehicle fairing envelope by providing that, in a launch configuration, the antenna reflector is stored forward of the forward surface of the spacecraft, and that, in the deployed, i.e., on-orbit, configuration, the antenna reflector is displaced outboard of the spacecraft main body and forward of the forward surface.

Such a design may be implemented, for example, through the use of an elevator tower mounted to a forward surface of a spacecraft. An elevator truck may be configured to translate between the end of the elevator tower mounted to the forward surface and a position further forward. A reflector boom may be connected at one end to a pivot on the elevator truck. A rigid antenna reflector may be connected with the other end of the reflector boom using a positioning mechanism. In a stowed position, i.e., in a launch configuration, the elevator truck may be at the end of the elevator tower mounted to the forward surface and the antenna reflector may be stored forward of the forward surface of the spacecraft, and with the antenna reflector aperture plane substantially parallel to the spacecraft yaw axis. In the deployed, i.e., on-orbit, configuration, the elevator truck may be displaced further forward, the reflector boom may extend from the elevator tower at an angle with respect to the position of the reflector boom in the stowed position, and the antenna reflector may be displaced substantially outboard of the main body and substantially forward of the forward surface.

In one embodiment, a spacecraft is provided, the spacecraft being reconfigurable between a launch configuration and an on-orbit configuration. The spacecraft may include a forward surface, an aft surface, a main body disposed between the forward surface and the aft surface, and a first rigid antenna reflector. The first rigid antenna reflector may be stored, in the launch configuration, forward of the forward surface, and displaced, in the on-orbit configuration, substantially outboard of the main body and substantially forward of the forward surface.

In a further embodiment, the spacecraft may also include a mechanism configured to move the first rigid antenna reflector between the launch configuration and the on-orbit configuration.

In some embodiments, the spacecraft may include a first antenna feed associated with the first rigid antenna reflector. The spacecraft may also include an elevator tower disposed with a first end proximate to the forward surface and a second end substantially forward of the main body, an elevator truck, wherein the elevator truck is configured to translate a first pivot from a first position at the first end of the elevator tower to a second position at the second end of the elevator tower, a first positioning mechanism coupled with the first rigid antenna reflector, and a first reflector boom having a first proximal end and a first distal end, the first proximal end coupled with the elevator truck via the first pivot and the first distal end coupled with the first rigid antenna reflector via the first positioning mechanism. In the launch configuration, the elevator truck is in the first position, the first reflector boom is drawn into a stowed position, the aperture plane of the first rigid antenna reflector is substantially parallel to the spacecraft yaw axis, and a substantial portion of the first rigid antenna reflector is forward of the forward surface and inboard of the main body. In the on-orbit configuration, the elevator truck is in the second position, the first reflector boom is extended away from the elevator tower and rotated about the first pivot, and the first rigid antenna reflector is illuminated by the first antenna feed.

In some further embodiments, the spacecraft may include a second rigid antenna reflector, wherein the second rigid antenna reflector is stored, in the launch configuration, forward of the forward surface, and displaced, in the on-orbit configuration, substantially outboard of the main body and substantially forward of the forward surface. The spacecraft may also include a second antenna feed associated with the second rigid antenna reflector. The mechanism may also further include a second positioning mechanism coupled with the second rigid antenna reflector, a second reflector boom having a second proximal end and a second distal end, the second proximal end coupled with the elevator truck via a second pivot, wherein the second pivot translates with the elevator truck, and the second distal end coupled with the second rigid antenna reflector via the second positioning mechanism. In the launch configuration, the second reflector boom is drawn into the stowed position, the aperture plane of the second rigid antenna reflector is substantially parallel to the spacecraft yaw axis, and a substantial portion of the second rigid antenna reflector is forward of the forward surface and inboard of the main body. In the on-orbit configuration, the second reflector boom is extended away from the elevator tower and rotated about the second pivot, and the first rigid antenna reflector is illuminated by the second antenna feed.

In some embodiments, in the launch configuration, the aperture plane of the first rigid antenna reflector may be substantially normal to the rotational axis of the first pivot.

In some embodiments, the spacecraft may include a drive mechanism configured to move the elevator truck between the first position and the second position. In some further embodiments, the spacecraft may include an elevator track spanning between the first position and the second position. The elevator track may be configured to guide the elevator truck during translation of the elevator truck between the first position and the second position. In some embodiments, the drive mechanism may be coupled with a motor and selected from the group consisting of a ball or lead screw, a cable and drum, or a rack and pinion.

In some embodiments, the elevator tower may include a first fixed pivot point, the first fixed pivot point engaged with the first reflector boom so as to permit rotation of the boom about the first fixed pivot point and to permit translation of the boom with respect to the first fixed pivot point along the longitudinal axis of the boom. The mechanism may be further configured such that translation of the elevator truck simultaneously rotates the first reflector boom about the first pivot and the first fixed pivot point and translates the first reflector boom, with respect to the first fixed pivot point, along the longitudinal axis.

In some embodiments, the first reflector boom may be coupled with the second reflector boom with a bi-fold strut. The bi-fold strut may be coupled with the first reflector boom between the first proximal end and the first distal end, and the bi-fold strut may be coupled with the second reflector boom between the second proximal end and the second distal end.

In some embodiments, the spacecraft may further include a third rigid antenna reflector. The third rigid antenna reflector may be stored, in the launch configuration, forward of the forward surface, and displaced, in the on-orbit configuration, substantially outboard of the main body and substantially forward of the forward surface. The spacecraft may also include a third antenna feed associated with the third rigid antenna reflector. The spacecraft may also include a fourth rigid antenna reflector. The fourth rigid antenna reflector may be stored, in the launch configuration, forward of the forward surface, and displaced, in the on-orbit configuration, substantially outboard of the main body and substantially forward of the forward surface. The spacecraft may also include a fourth antenna feed associated with the fourth rigid antenna reflector. The mechanism may further include a third positioning mechanism coupled with the third rigid antenna reflector and to the first distal end, and a fourth positioning mechanism coupled with the fourth rigid antenna reflector and the second distal end. In the launch configuration, the aperture planes of the third rigid antenna reflector and the fourth rigid antenna reflector are substantially parallel to the spacecraft yaw axis, and the third rigid antenna reflector and the fourth rigid antenna reflector are forward of the forward surface and inboard of the main body. In the on-orbit configuration, the third rigid antenna reflector and the fourth rigid antenna reflector are illuminated by the third antenna feed and fourth antenna feed, respectively.

In some embodiments, the first positioning mechanism may be configured to provide dual-axis rotation.

In some embodiments, the spacecraft may additionally include a first crossboom, the first crossboom coupled with the first positioning mechanism at a first end of the first crossboom, the first crossboom coupled with the third positioning mechanism at a second end of the first crossboom, and the first crossboom coupled with the first distal end between the first end and the second end of the first crossboom, wherein the first rigid antenna reflector and the third rigid antenna reflector are coupled with the first reflector boom via the first crossboom. The spacecraft may also include a second crossboom, the second crossboom coupled with the second positioning mechanism at a first end of the second crossboom, the second crossboom coupled with the fourth positioning mechanism at a second end of the second crossboom, and the second crossboom coupled with the second distal end between the first end and the second end of the second crossboom, wherein the second rigid antenna reflector and the fourth rigid antenna reflector are coupled with the second reflector boom via the second crossboom.

Some embodiments may further include at least one latch movable between a first latch position and a second latch position. The at least one latch may prevent the elevator truck from moving from the second position when the elevator truck is in the second position and the at least one latch is in the first latch position. The at least one latch may also not prevent the elevator truck from moving from or to the second position when the at least one latch is in the second latch position.

In some embodiments, the first antenna feed may be located approximately midway between the forward surface and the aft surface.

Some embodiments may include a first reflector boom which deploys to the east side of the spacecraft. Some other embodiments may include a first reflector boom which deploys to the north side of the spacecraft.

In some embodiments, the first rigid antenna reflector may be characterized by a focal length, the focal length being no less than the axial length of the main body along the yaw axis.

Some embodiments may provide an antenna reflector deployment mechanism for a spacecraft, the antenna reflector deployment mechanism being reconfigurable between a launch configuration and an on-orbit configuration and configured to be mounted to a forward surface of a main body of the spacecraft. The antenna reflector deployment mechanism may include an elevator tower, wherein the elevator tower is configured to be disposed with a first end proximate to the forward surface and a second end further away from the forward surface of the spacecraft, an elevator truck, wherein the elevator truck is configured to translate from a first position at the first end of the elevator tower to a second position at the second end of the elevator tower, a first positioning mechanism configured to be coupled with a first rigid antenna reflector, and a first reflector boom having a first proximal end and a first distal end, the first proximal end coupled with the elevator truck via a first pivot and the first distal end coupled with the first rigid antenna reflector via the first positioning mechanism. In the launch configuration, the elevator truck is in the first position, the first reflector boom is drawn into a stowed position, the aperture plane of the first rigid antenna reflector is substantially parallel to the elevator tower, and a substantial portion of the first rigid antenna reflector is between the first end and the second end of the elevator tower. In the on-orbit configuration, the elevator truck is in the second position, the first reflector boom is extended away from the second end of the elevator tower at a substantial angle with respect to the elevator tower, and the aperture plane of the first rigid antenna reflector is substantially parallel to the rotational axis of the first pivot. The antenna reflector deployment mechanism may be configured such that the first rigid antenna reflector is stored, in the launch configuration, forward of the forward surface, and displaced, in the on-orbit configuration, substantially outboard of the main body and substantially forward of the forward surface.

In some embodiments of the antenna reflector deployment mechanism, the antenna reflector deployment mechanism may be configured such that the aperture plane of the first rigid antenna reflector is substantially normal to the rotational axis of the first pivot.

In some embodiments, the antenna reflector deployment mechanism may further include a second positioning mechanism configured to be coupled with a second rigid antenna reflector and a second reflector boom having a second proximal end and a second distal end, the second proximal end coupled with the elevator truck via a second pivot and the second distal end coupled with the second rigid antenna reflector via the second positioning mechanism. In the launch configuration, the second reflector boom is drawn into a stowed position, the aperture plane of the second rigid antenna reflector is substantially parallel to the elevator tower, and a substantial portion of the second rigid antenna reflector is between the first end and the second end of the elevator tower. In the on-orbit configuration, the second reflector boom is extended away from the second end of the elevator tower at a substantial angle with respect to the elevator tower, and the aperture lane of the second rigid antenna reflector is substantially parallel to the rotational axis of the first pivot. The second rigid antenna reflector is stored, in the launch configuration, forward of the forward surface, and displaced, in the on-orbit configuration, substantially outboard of the main body and substantially forward of the forward surface.

In some embodiments, the antenna reflector deployment mechanism may further include a drive mechanism configured to move the elevator truck between the first position and the second position. In yet further embodiments, the antenna reflector deployment mechanism may also include an elevator track spanning between the first position and the second position. The elevator track may be configured to guide the elevator truck during translation of the elevator truck between the first position and the second position. The drive mechanism may be coupled with a motor and selected from the group consisting of a ball or lead screw, a cable and drum, or a rack and pinion.

In some embodiments, the elevator tower may include a first fixed pivot point, the first fixed pivot point engaged with the first reflector boom so as to permit rotation of the boom about the first fixed pivot point and to permit translation of the boom with respect to the first fixed pivot point along the longitudinal axis of the boom. The antenna reflector deployment mechanism may be further configured such that translation of the elevator truck simultaneously rotates the first reflector boom about the first pivot and the first fixed pivot and translates the first reflector boom, with respect to the first fixed pivot point, along the longitudinal axis.

In some embodiments, the first reflector boom may be coupled with the second reflector boom with a bi-fold strut, the bi-fold strut may be coupled with the first reflector boom between the first proximal end and the first distal end, and the bi-fold strut may be coupled with the second reflector boom between the second proximal end and the second distal end. The bi-fold strut may be configured to unfold as the antenna reflector deployment mechanism is reconfigured from the launch configuration to the on-orbit configuration and stiffen the first reflector boom and the second reflector boom when the antenna reflector deployment mechanism is in the on-orbit configuration.

In some configurations, the antenna reflector deployment mechanism includes a third positioning mechanism configured to be coupled with a third rigid antenna reflector and to the first distal end and a fourth positioning mechanism configured to be coupled with a fourth rigid antenna reflector and the second distal end. In the launch configuration, the aperture planes of the third rigid antenna reflector and the fourth rigid antenna reflector is substantially parallel to the elevator tower, and a substantial portion of the third rigid antenna reflector and a substantial portion of the fourth rigid antenna reflector is between the first end and the second end of the elevator tower. In the on-orbit configuration, the aperture planes of the third rigid antenna reflector and the fourth rigid antenna reflector is substantially parallel to the rotation axis of the first pivot rotational axis and the second pivot rotational axis, respectively. The third rigid antenna reflector and the fourth antenna reflector is stored, in the launch configuration, forward of the forward surface, and displaced, in the on-orbit configuration, substantially outboard of the main body and substantially forward of the forward surface.

In some embodiments of the antenna reflector deployment mechanism, the first positioning mechanism may be configured to provide dual-axis rotation.

In some embodiments, the antenna reflector deployment mechanism may further include a first crossboom, the first crossboom coupled with the first positioning mechanism at a first end of the first crossboom, the first crossboom coupled with the third positioning mechanism at a second end of the first crossboom, and the first crossboom coupled with the first distal end between the first end and the second end of the first crossboom, wherein the first rigid antenna reflector and the third rigid antenna reflector are coupled with the first reflector boom via the first crossboom. The antenna reflector deployment mechanism may also include a second crossboom, the second crossboom coupled with the second positioning mechanism at a first end of the second crossboom, the second crossboom coupled with the fourth positioning mechanism at a second end of the second crossboom, and the second crossboom coupled with the second distal end between the first end and the second end of the second crossboom, wherein the second rigid antenna reflector and the fourth rigid antenna reflector are coupled with the second reflector boom via the second crossboom.

In some embodiments, the antenna reflector deployment mechanism may further include at least one latch movable between a first latch position and a second latch position. The at least one latch may prevent the elevator truck from moving from the second position when the elevator truck is in the second position and the at least one latch is in the first latch position. The at least one latch may also not prevent the elevator truck from moving from or to the second position when the at least one latch is in the second latch position.

In some embodiments, a spacecraft may be reconfigured from a launch configuration to an on-orbit configuration. The spacecraft may include a first rigid antenna reflector, a first antenna feed, a main body, a forward surface, and an aft surface, the main body located substantially between the forward surface and the aft surface. The spacecraft may be reconfigured by moving the first rigid antenna reflector from a position wherein the first rigid antenna reflector is forward of the forward surface, inboard of the main body, and substantially parallel to the spacecraft yaw axis to a position wherein the first rigid antenna reflector is illuminated by the first antenna feed and displaced substantially forward of the forward surface and outboard of the main body.

In some further embodiments, the spacecraft may further be reconfigured by translating a first pivot from a position forward of the forward surface to a position further forward of the forward surface and in a direction substantially parallel to the spacecraft yaw axis and rotating a first boom including a first distal end and a first proximate end about the first pivot. The first proximate end may be rotatably coupled with the first pivot and translate with the first pivot, the first distal end may be coupled with a first positioning mechanism, and the first positioning mechanism may be coupled with the first rigid antenna reflector. The first rigid antenna reflector may be rotated via the first positioning mechanism.

DETAILED DESCRIPTION

Figure 1A:
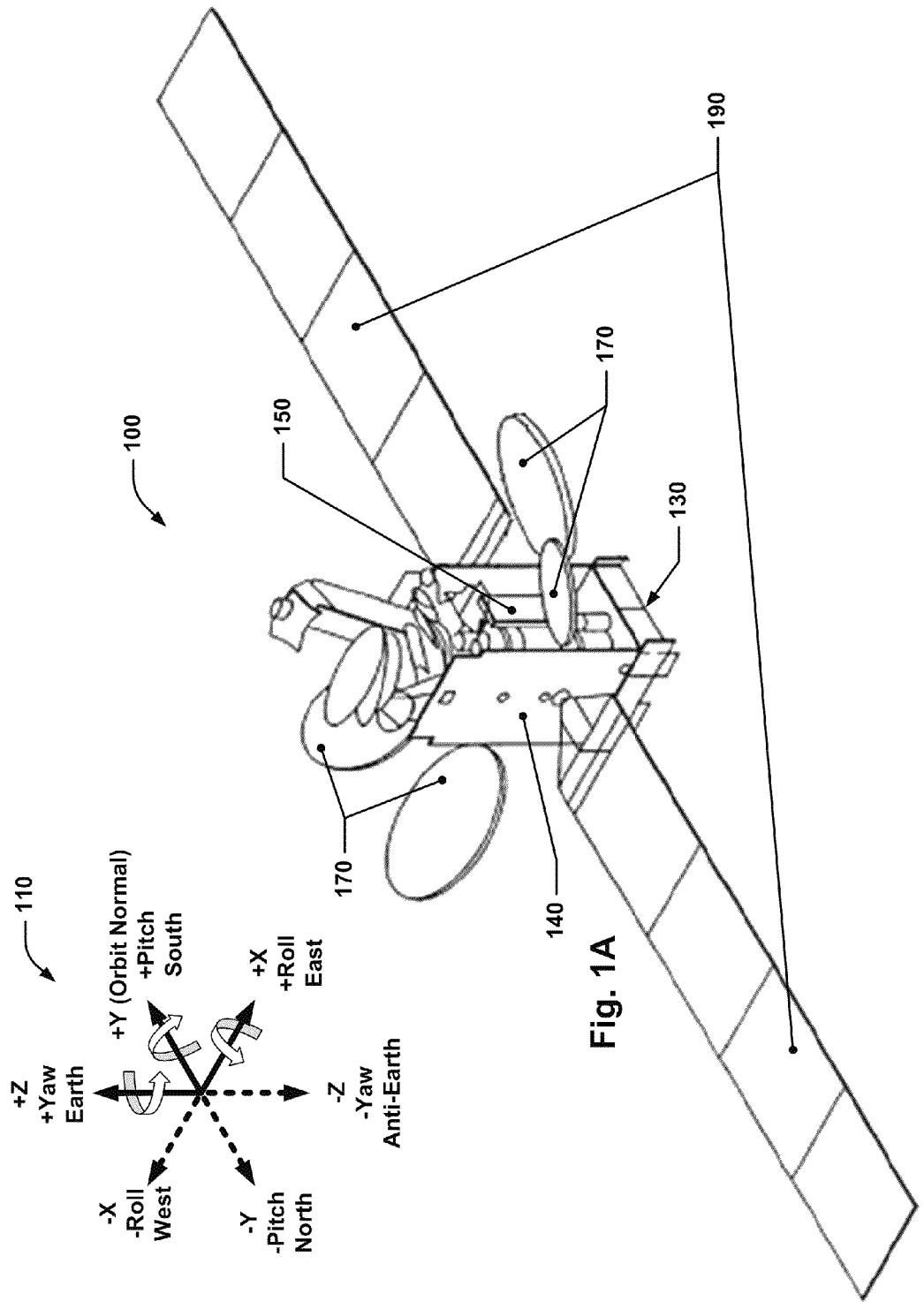
FIG. 1A depicts an isometric view of a generic satellite showing major components as well as a reference coordinate system.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to or with another element, it can be directly connected or coupled to or with the other element, or intervening elements may be present. Furthermore, "connected" or "coupled" as used herein in an electrical context may include wirelessly connected or coupled. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The phrase "substantially parallel" as used herein, unless otherwise expressly indicated, refers to a relationship in which one generally linear or flat part is either parallel to, or at a small acute angle to, another generally linear or flat part.

For example, in some embodiments, a deployed antenna reflector attached to the distal end of a reflector boom may have an aperture plane which is substantially parallel to the axis of rotation for the reflector boom—the deployed antenna reflector, however, may be rotationally offset from an ideal "parallel" configuration to allow the antenna reflector to be illuminated by an antenna feed and to aim the boresight at a target. As used herein, substantially parallel parts may be, for example, at as much as approximately a 10° or 30° angle with respect to each other and still be considered to be substantially parallel. In some instances, a part may be described as being substantially parallel to a much larger part, in which case the relationship is to be understood as being between the part and a surface of the larger part which is proximate to the part, e.g., the reflector boom may be substantially parallel to the main body if the reflector boom is substantially parallel to the surface of the main body to which it is closest.

The phrase "substantially normal" as used herein, unless otherwise expressly indicated, refers to a relationship in which a plane or generally flat part or surface is either normal to, or at a minimum angle close to 90° with respect to, a reference axis. A plane which is substantially normal to an axis may be, for example, at as much as approximately a 60° or 80° minimum angle with respect to the axis and still be considered to be substantially normal.

The term "aperture plane" refers to a reference plane for an antenna reflector which is generally defined by the antenna reflector edge, e.g., the outer perimeter of the antenna reflector. Some antenna reflectors may actually include multiple reflector surfaces within the reflector, e.g., in a layered fashion, each with their own reflector edge, although the singular "aperture plane" is used herein to refer to single- and multiple-reflector surface reflectors.

The term "main body" as used herein, unless otherwise expressly indicated, refers to the nominal major structure of the spacecraft. The main body typically contains the internal payload and bus equipment of the spacecraft and provides structural mounting locations for various external elements, such as solar panels, antenna reflectors, thermal management elements, antenna feeds, delivery vehicle mating interfaces, modules, etc.

The term "aft surface" as used herein, unless otherwise expressly indicated, refers to the major surface of a spacecraft main body which is furthest aft when the spacecraft is in the launch configuration on a delivery vehicle. Aft is defined as being opposite the direction of travel of the delivery vehicle. There may be other surfaces which are further aft of the aft surface, such as surfaces on a launch vehicle mating interface, but these are typically much smaller surfaces. The aft surface may be substantially planar, or may be contoured or possess other minor features.

The term "forward surface" as used herein, unless otherwise expressly indicated, refers to the major surface of a spacecraft main body which is furthest forward when the spacecraft is in the launch configuration on the delivery vehicle. Forward, in this context, is defined as being in the direction of travel of the delivery vehicle. It is to be understood that the term "forward surface" does not refer to structures which are movable with respect to the main body, e.g., repositionable reflectors. It is to be further understood that the term forward surface also does not refer to minor surfaces on structures or modules which extend from the forward surface. For example, in some embodiments, a module may extend from the forward surface. The module may possess a substantially smaller cross-sectional area than the forward surface area, i.e., a minor surface. As used herein, the top of such a module should not be construed to constitute the "forward surface."

The terms "outboard" and "inboard" as used herein, unless otherwise indicated, refer to relationships between one element/portion and another element/portion based on their distances from the yaw axis of a satellite. For example, if most of component A is located a further perpendicular distance from the yaw axis than most of component B, component A may be said to be "outboard" of component B. Similarly, component B may be said to be "inboard" of component A. There may be some portions of component A which are closer to the yaw axis than some portions of component B, but it will be understood that component A may nonetheless still be substantially outboard of component B.

Figure 1B:
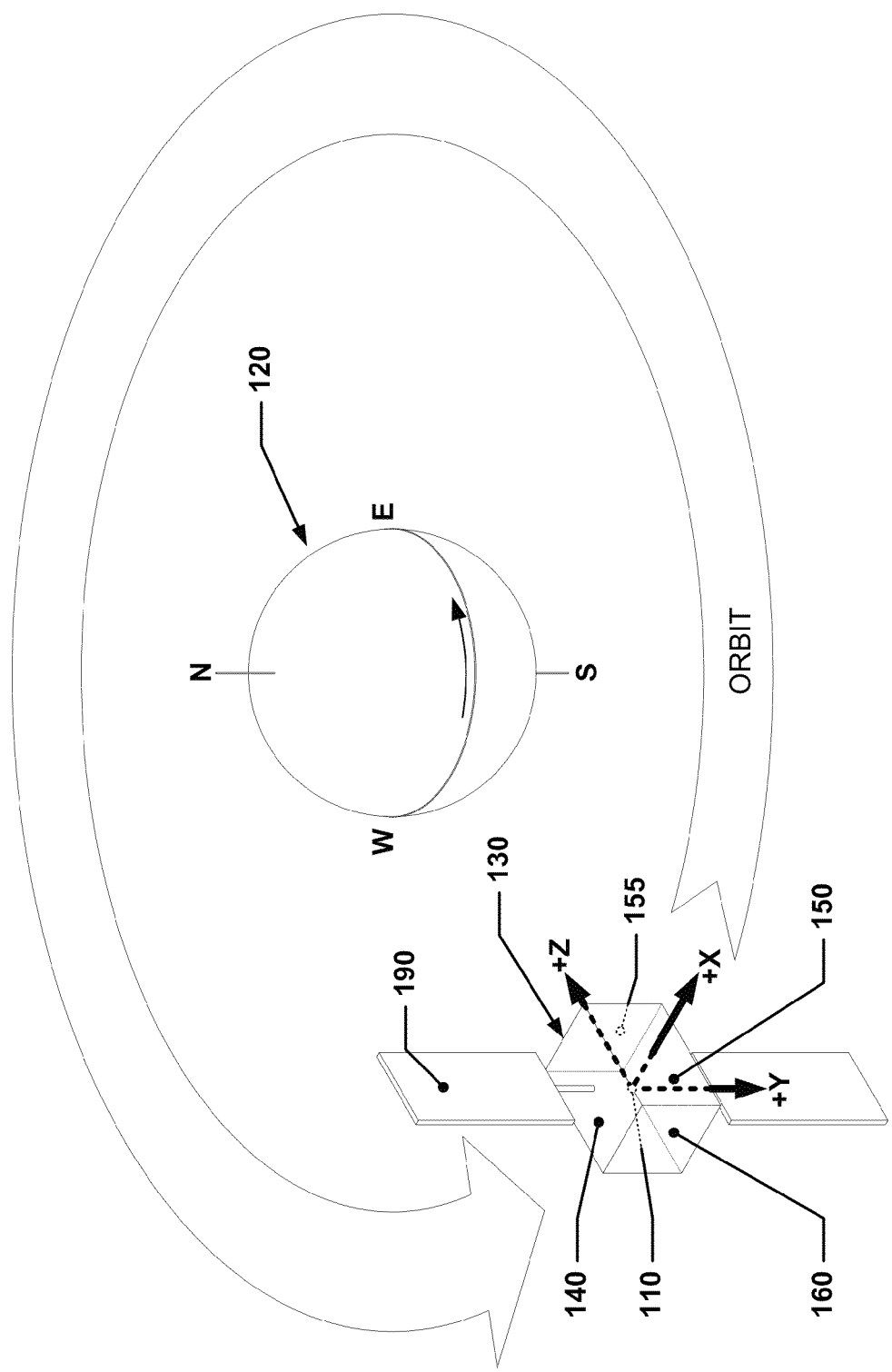
FIG. 1B depicts a simplified diagram showing a generic satellite in orbit about a planet.
Figure 1C:
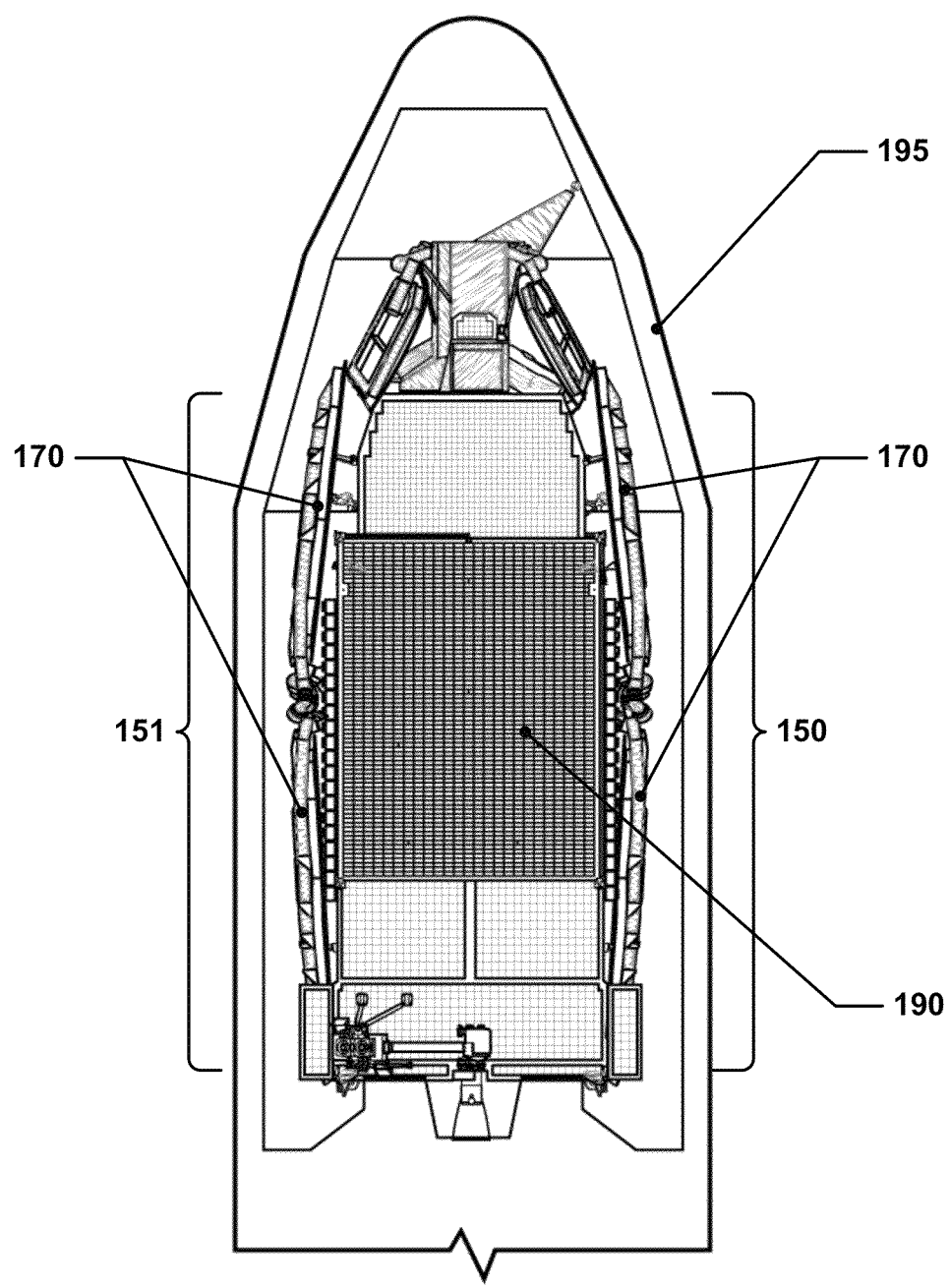
FIG. 1C depicts an elevation view of a generic satellite mounted to a launch vehicle.

FIGS. 1A-1C depict various generic prior-art spacecraft for discussion purposes. Spacecraft, which may also be referred to herein as satellites, typically possess a main body with North (N), South (S), East (E), and West (W) panels which are disposed between and orthogonal to an aft panel and a forward panel of the main body. Each panel is labeled according to the general direction toward which its normal vector is oriented when the satellite is on-orbit. The panels of the N, S, E, and W panels may, generically, also be referred to as side panels, sides, or surfaces. The aft and forward panels may, generically, also be referred to as aft and forward surfaces, respectively. For example, an on-orbit satellite is generally oriented such that normal vectors drawn from the N panel and the S panel are in substantial alignment with the N-S axis of the Earth, with the N panel facing North and the S panel facing South, and such that the normal vectors drawn from the E panel and the W panel are in substantial alignment with the E-W direction.

Satellites may include one or more antenna systems designed to communicate with distant targets, such as locations on Earth. An antenna system may include, for example, an antenna reflector illuminated by a radio-frequency feed (RF feed). Such an antenna reflector may, for example, be an on-axis or off-axis parabolic reflector dish.

Antenna reflectors may be either furlable or rigid structures. Furlable antenna reflectors are typically, when unfurled, substantially larger in diameter than the launch vehicle fairing, and are therefore required to be "furled" into a much smaller launch configuration volume.

By way of contrast, rigid antenna reflectors are not designed to unfurl, and cannot be placed into a stowed configuration which is much smaller in volume compared to the operational configuration. Instead, they are constructed to maintain their overall shape during stowage, launch, deployment, and on-orbit use. A rigid antenna reflector may be capable of flexing and otherwise deforming in minor ways, however the overall shape of a rigid antenna reflector will stay the same. Rigid antenna reflectors are often mounted to mechanisms which are attached to a side panel of a spacecraft and which fold the antenna reflector against the side panel in the launch configuration such that the antenna reflector aperture plane is substantially parallel to the side panel and such that at least a substantial portion of the antenna reflector is aft of the forward panel. Spacecraft 100 shown in FIG. 1A includes two side-mounted antenna reflectors on the E side which fold against the E side and two side mounted antenna reflectors on the W side which fold against the W side. FIG. 1C shows a similar spacecraft in a launch configuration with the antenna reflectors in the stowed positions on the E and W sides.

A better understanding of the reference frames used to describe satellites may be obtained by referring to FIGS. 1A and 1B, wherein an Earth-pointing three axis stabilized satellite 100 is illustrated with respect to a reference spacecraft body coordinate frame 110 having roll (x), pitch (y), and yaw (z) axes. Conventionally, the yaw axis is defined as being directed along a line intersecting Earth 120 center of mass and spacecraft 100 center of mass; the roll axis is defined as being perpendicular to the yaw axis, lying in the plane of the orbit in the direction of the spacecraft velocity vector; and the pitch axis (y), normal to the orbit plane, completes a three-axis, right-hand orthogonal system. Satellite 100 has a main body 130 substantially in the form of a rectangular cuboid. A first panel surface 140, orthogonal to the y-axis, faces generally north when the satellite is in an on-orbit configuration, and may be referred to hereinafter as the north panel. A second panel surface 150, orthogonal to the x-axis, may be referred to hereinafter as the east panel. A third panel surface and a fourth panel surface (not shown), disposed opposite, respectively, to north panel 120 and east panel 140, will be referred to hereinafter, respectively, as the south panel and the west panel. In some embodiments, the satellite may have curved sides or otherwise depart from a true rectangular cuboid. In such embodiments, terms east, west, north, and south may still be used to refer to portions of the satellite which generally face in those directions when the satellite is on-orbit.

Referring now to FIG. 1B, satellite 100 may also include Earth deck 155 and anti-Earth deck 160. Conventionally, Earth deck 155 is orthogonal to the z axis and facing earthwards (or towards whatever body the satellite orbits); anti-Earth deck 160 is also orthogonal to the z axis, but facing away from the Earth. Earth deck 155 or anti-Earth deck 160 may have additional separately attached or integrated structures which extend away from either deck.

Referring now to FIG. 1C, a launch configuration of satellite 100 is illustrated in elevation view, together with a typical launch vehicle fairing envelope 195. It may be observed that, in the launch configuration, solar arrays 190 are disposed proximate to north panel 140 and the south panel (not shown) and that antenna reflectors 170 are disposed proximate to east panel 150 and west panel 151.

Figure 2A:
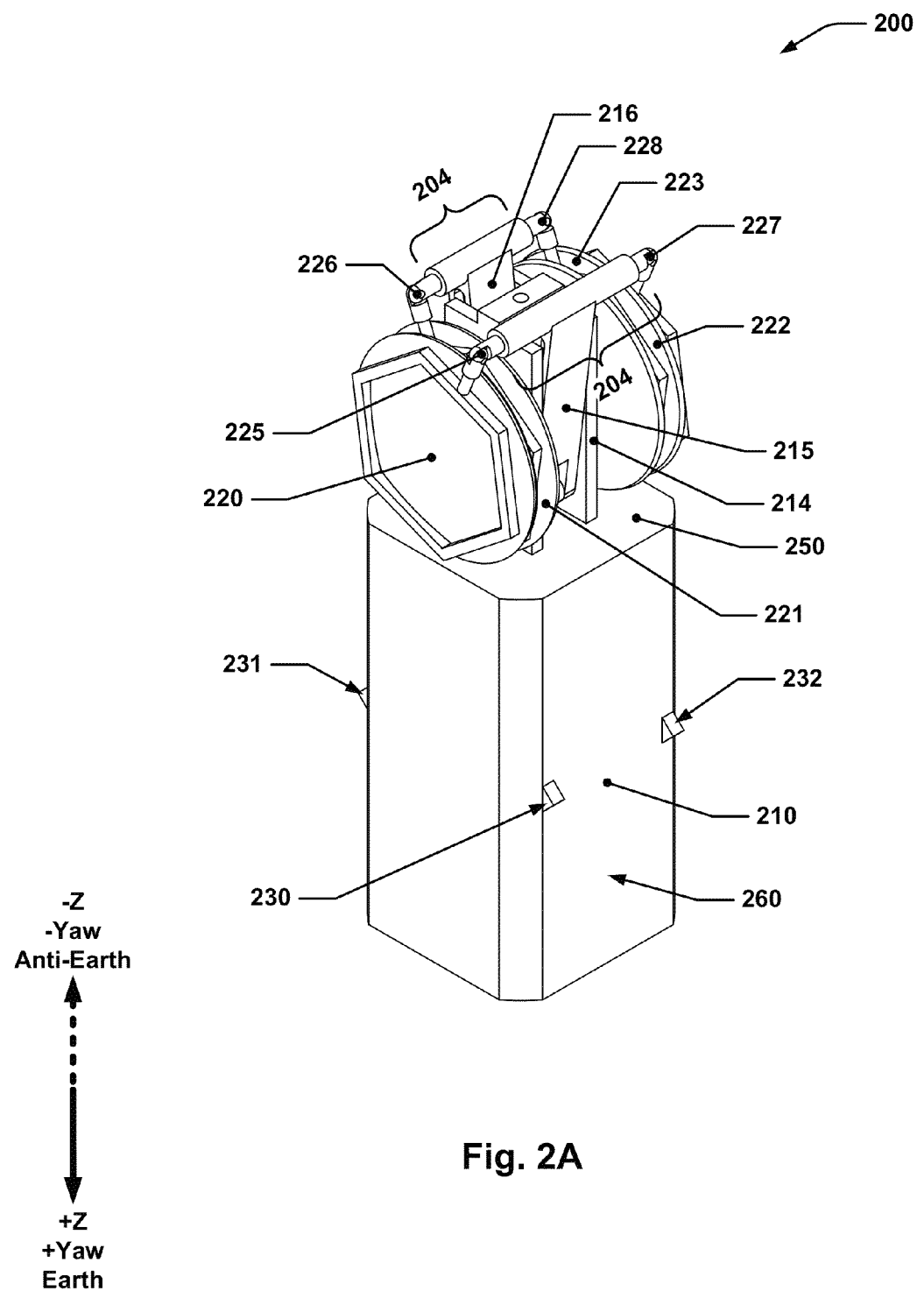
FIG. 2A depicts one conceptual satellite embodiment in a launch configuration.
Figure 2B:
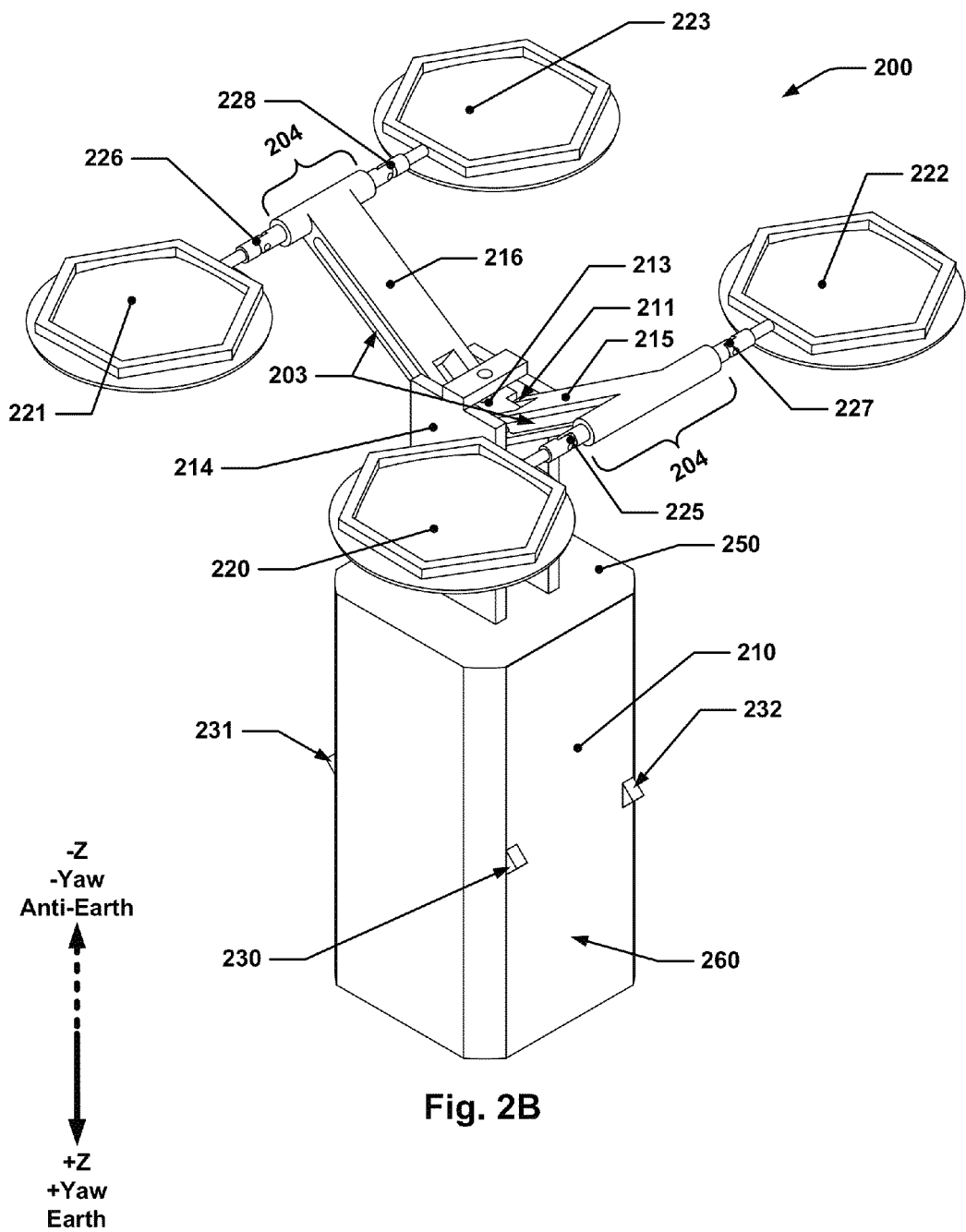
FIG. 2B depicts the satellite embodiment of FIG. 2A in an on-orbit configuration.

In an embodiment illustrated in FIGS. 2A and 2B, an antenna reflector packaging solution is provided that allows for the use of a rigid antenna reflector featuring a large focal length while respecting conventional launch vehicle fairing envelope constraints. FIGS. 2A and 2B depict a conceptual view of an example embodiment; as such, some major spacecraft components which would typically be shown, such as solar panels, have been omitted for clarity. FIG. 2A shows the example embodiment in the launch configuration, and FIG. 2B shows the example embodiment in the on-orbit configuration. Satellite 200 may include main body 210, which is disposed between the aft surface (not shown) of satellite 200 and forward surface 250. In an embodiment, the aft surface corresponds to Earth deck 155 and forward surface 250 corresponds to anti-Earth deck 160. Elevator tower 214 may be disposed on forward surface 250 of spacecraft 200. Elevator truck 213 may be configured to translate between the end of elevator tower 214 proximate to forward surface 250 and a position further forward. Reflector booms 215 and 216 may be connected at their inboard ends to first pivot 211 and a second pivot (not shown in FIGS. 2A and 2B), respectively, on elevator truck 213.

Figure 2C:
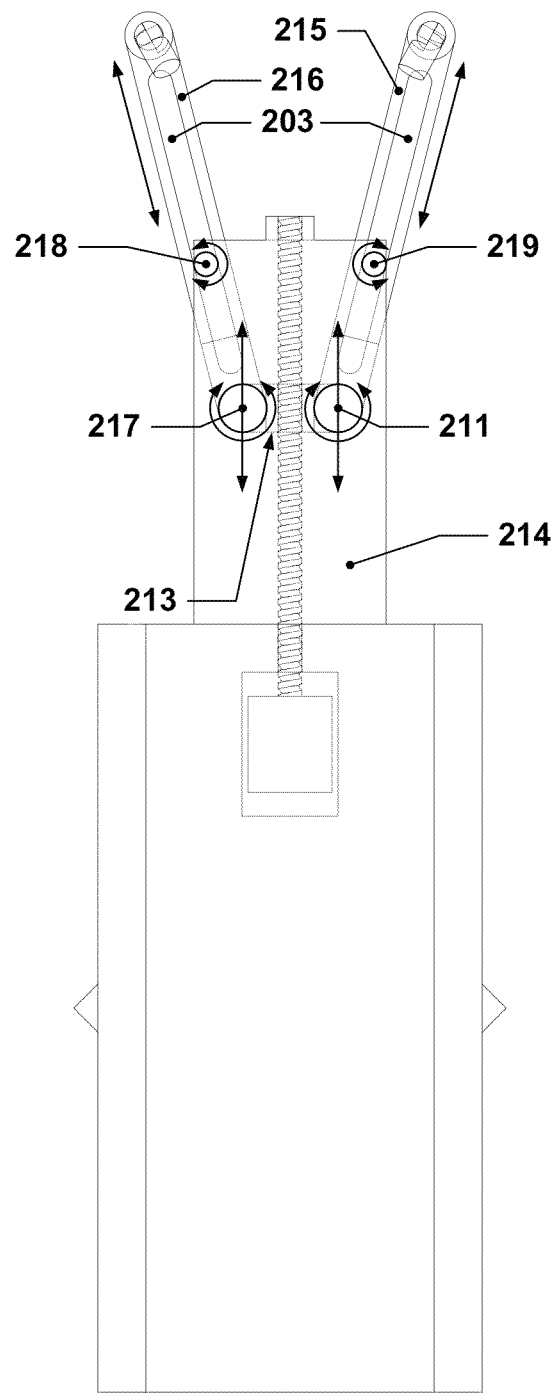
FIG. 2C depicts a front view of the satellite depicted in FIGS. 2A and 2B, although without various details, such as antenna reflectors.
Figure 2D:
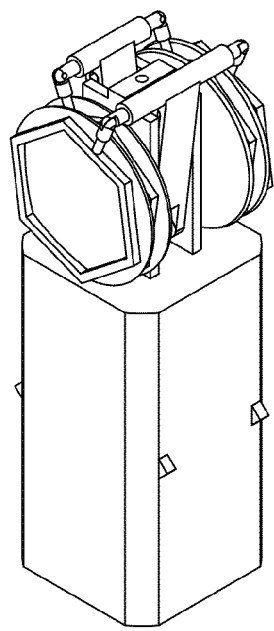
FIGS. 2D-2H depict the satellite embodiment of FIG. 2A during various stages of transition from the launch configuration (FIG. 2D) to the on-orbit configuration (FIG. 2H).

Referring now to FIG. 2C, elevator tower 214 may also include first fixed pivot point 219 and second fixed pivot point 218, both of which remain fixed with respect to elevator tower 214. Reflector booms 215 and 216 may also rotate about first fixed pivot 219 point and second fixed pivot point 218, respectively. Reflector booms 215 and 216 may also translate along their respective boom major axes with respect to first fixed pivot point 219 and second fixed pivot point 218, respectively. For example, reflector booms 215 and 216 may be equipped with slots 203, which slidably engage with first fixed pivot point 219 and second fixed pivot point 218, respectively. Spacecraft 200 may be configured such that translation of elevator truck 213, first pivot 211, and second pivot 217 simultaneously rotates first reflector boom 215 about first pivot 211 and first fixed pivot point 219 and simultaneously rotates second reflector boom 216 about second pivot 217 and second fixed pivot point 218.

Returning to FIGS. 2A and 2B, first rigid antenna reflector 220 and third rigid antenna reflector 222 may be coupled with first reflector boom 215 via first positioning mechanism 225 and third positioning mechanism 227, respectively. Second rigid antenna reflector 221 and fourth rigid antenna reflector 223 may be coupled with second reflector boom 216 via second positioning mechanism 226 and fourth positioning mechanism 228.

Referring now to FIG. 2A, in a stowed position, i.e., in a launch configuration, elevator truck 213 may be at the end of elevator tower 214 proximate to forward surface 250 and antenna reflectors 220-223 may be stored forward of forward surface 250 and with the aperture planes for antenna reflectors 220-223 substantially parallel to the spacecraft yaw axis. Advantageously, a substantial portion of each antenna reflector may be disposed "inboard" of the main body, by which is meant, here and in the claims, that the substantial portion of the antenna reflector is closer to the yaw axis than an element of the main body that is furthest from the yaw axis.

Referring now to FIG. 2B, in the deployed, i.e., on-orbit, configuration, elevator truck 213 may be translated a distance forward of the forward surface, reflector booms 215 and 216 may extend from elevator tower 214 at an angle with respect to elevator tower 214, and the aperture planes for antenna reflectors 220-223 may be substantially parallel to, or at a slight angle to, the axis of rotation of first pivot 211 and the second pivot.

Satellite 200 may include elevator tower 214, which includes elevator truck 213. Elevator truck 213 may include features used to provide for translational movement between a first end and second end of elevator tower 214. For example, elevator truck 213 may include an interface for a draw cable or a screw drive. Elevator truck 213 may also include first pivot 211. Elevator truck 213 may also include a second pivot (not shown).

Satellite 200 may also include first antenna reflector 220, which may be connected with first positioning mechanism 225. First antenna reflector 220 may be coupled with first reflector boom 215 by first positioning mechanism 225. First positioning mechanism 225 may be a dual-axis positioning mechanism (DAPM) capable of rotating first antenna reflector 220 about two different axes. First reflector boom 215 may be coupled with elevator truck 213 via first pivot 211. For discussion purposes, the inboard end of a reflector boom which is coupled with elevator truck 213 may be referred to as the proximal end, and the outboard end of a reflector boom which is coupled with a positioning mechanism may be referred to as the distal end. In some embodiments, the end of reflector booms 215 and 216 may be coupled with positioning mechanisms 225-228 using cross-boom 204, which may allow for the attached antenna reflector(s) to be spaced further from or closer to the yaw axis of the satellite.

In general, the on-orbit configurations of the antenna reflectors are driven by the antenna feed locations and the antenna pointing requirements. In some embodiments, a three-axis positioning mechanism (TAPM) may be used. In some alternative embodiments, a DAPM may be used in combination with a third axis of rotation supplied elsewhere in the spacecraft, such as via a skew in the boom pivot axis. For example, while some embodiments may have a first pivot rotational axis which is oriented generally perpendicular to planes defined by the pitch, roll, or yaw axes of the spacecraft, other embodiments may have a first pivot rotational axis which is at an angle or a compound angle to planes defined by the pitch, roll, or yaw axes of the spacecraft.

Satellite 200 may also include second antenna reflector 221, which may be connected with second positioning mechanism 226. Second antenna reflector 221 may be coupled with the distal end of second reflector boom 216 by second positioning mechanism 226. Second positioning mechanism 226 may be a DAPM capable of rotating second antenna reflector 221 about two different axes. The proximal end of second reflector boom 216 may be coupled with elevator truck 213 via the second pivot (not shown). In some embodiments, the first reflector boom and second reflector boom may both be rotatably connected with the elevator truck about a common pivot, i.e., the first pivot and the second pivot may be coaxial and/or implemented using the same component or components. In other embodiments, such as the example embodiment shown in FIGS. 2A and 2B, the first pivot and the second pivot may not be coaxial. Second reflector boom 216 may be mounted to a side of elevator truck 213 opposite the side of elevator truck 213 to which first reflector boom 215 is mounted.

Satellite 200 may additionally include third antenna reflector 222, which may be connected with third positioning mechanism 227. Third antenna reflector 222 may be coupled with the distal end of first reflector boom 215 by third positioning mechanism 227. Third positioning mechanism 227 may be a DAPM capable of rotating third antenna reflector 222 about two different axes.

Satellite 200 may further include fourth antenna reflector 223, which may be connected with fourth positioning mechanism 228. Fourth antenna reflector 223 may be coupled with the distal end of second reflector boom 216 by fourth positioning mechanism 228. Second positioning mechanism 228 may be a DAPM capable of rotating fourth antenna reflector 223 about two different axes.

First antenna reflector 220, second antenna reflector 221, third antenna reflector 222, and/or fourth antenna reflector 223 may each be characterized by a focal length, the focal lengths being no less than the axial length of the main body along the yaw axis, i.e., no less than the minimum distance separating the forward and the aft surfaces. In some embodiments, the focal length may be more than 1.5 times the axial length of the main body along the yaw axis.

Satellite 200 may also include first antenna feed 230, second antenna feed 231, third antenna feed 232, and a fourth antenna feed (not shown); each antenna feed may be associated with a respective antenna reflector. It is to be understood that each antenna feed may, in practice, comprise several separate antenna feeds which are all intended to be used with the same common antenna reflector. It is to be understood that the use of a singular antenna feed in association with an antenna reflector herein is intended to embrace multi-feed systems in addition to single-feed systems.

The antenna feeds for satellite 200 may be located approximately midway between forward surface 250 and the aft surface. Such placement allows for the average length of the waveguides for the antenna feeds to be minimized, which may reduce the average line losses associated with the feeds. For example, first antenna feed 230, second antenna feed 231, third antenna feed 232, and/or the fourth antenna feed (not shown) may be located approximately midway along the main body in the yaw axis direction.

While the embodiment depicted features four antenna reflectors and two reflector booms, it is to be recognized that configurations with more or fewer of some of these components fall within the scope of this disclosure. For example, some embodiments may include a reflector boom with a single antenna reflector.

Figure 2E:
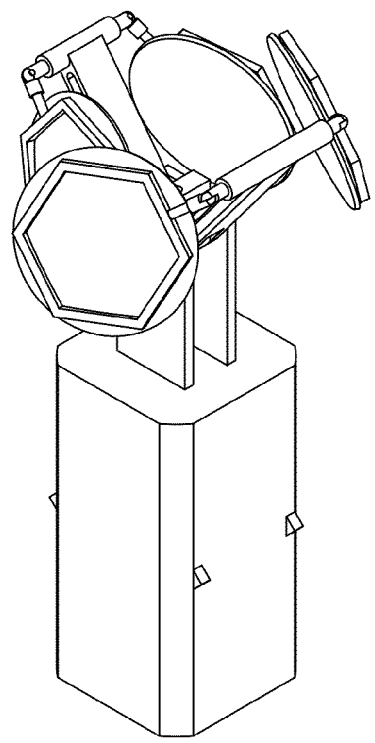
Figure 2F:
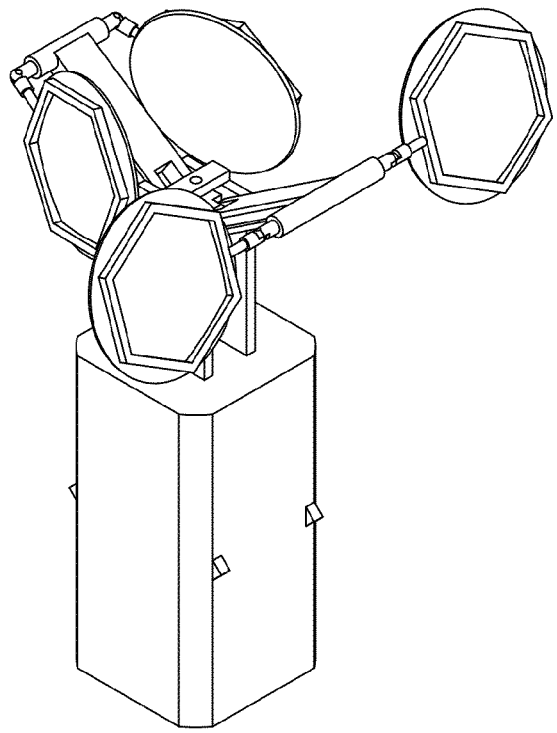
Figure 2G:
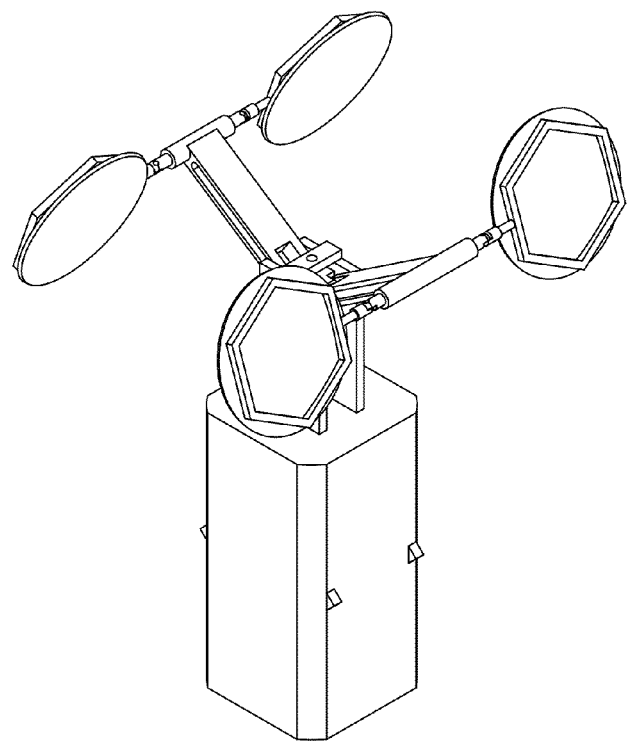
Figure 2H:
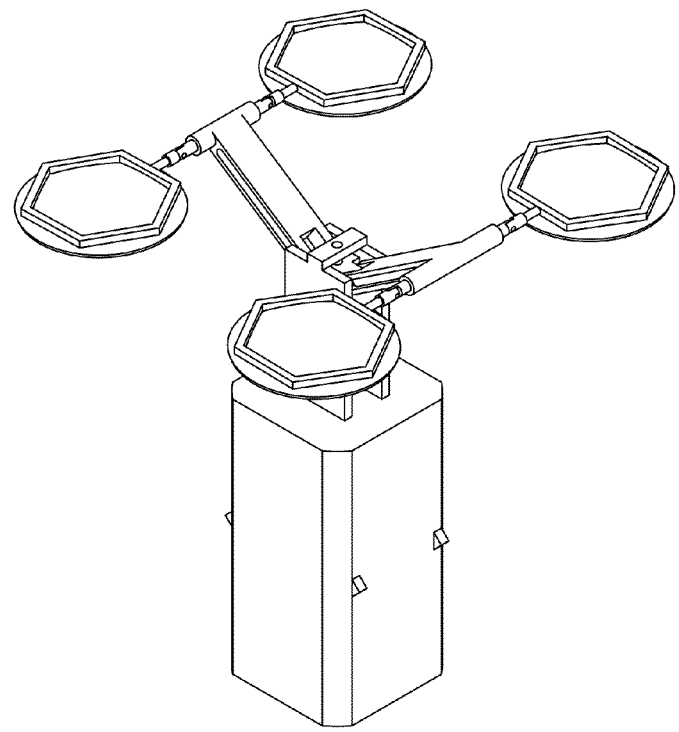

Satellite 200 may be reconfigurable between a launch configuration and an on-orbit configuration. FIGS. 2D-2H depict satellite 200 transitioning from a launch configuration (FIG. 2D) to an on-orbit configuration (FIG. 2H). Potential intermediate configurations are shown in FIGS. 2E-2G.

Referring to FIG. 2A, in the launch configuration, the elevator truck may be located at a first position near the end of elevator tower 214 which is proximate to forward surface 250. First reflector boom 215 and second reflector boom 216 may be placed in a stowed configuration wherein the major axes of the two reflector booms are substantially parallel and in close proximity. In some embodiments, the two reflector booms 215 and 215 may be drawn inside of elevator tower 214. In some such embodiments, the distal ends of the two reflector booms 215 and 216 may extend beyond the top of elevator tower 214. In some other such embodiments, elevator tower 214 may extend beyond the distal ends of the reflector booms; in such cases, the distal ends of the reflector booms may instead extend beyond the sides of elevator tower 214. First antenna reflector 220 may be oriented such that the antenna reflector aperture plane for first antenna reflector 220 is substantially parallel to satellite 200's yaw axis. In some embodiments, antenna reflector 220 may further be oriented such that the antenna reflector aperture plane for first antenna reflector 220 is substantially normal to the rotational axis for first pivot 211 and that a substantial portion of antenna reflector 220 is forward of forward surface 250. For example, in some embodiments, the antenna reflectors may partially nestle in a recess in the forward surface—in such embodiments, a substantial portion of an antenna reflector is still forward of the forward surface. Second antenna reflector 221, third antenna reflector 222, and fourth antenna reflector 223 may also be oriented such that the antenna reflector aperture planes for second antenna reflector 221, third antenna reflector 222, and fourth antenna reflector 223 are substantially parallel satellite 200's yaw axis. In some embodiments, second antenna reflector 221, third antenna reflector 222, and fourth antenna reflector 223 may further be oriented such that their antenna reflector aperture planes are substantially normal to the rotational axes for the second pivot, the first pivot, and the second pivot, respectively. In embodiments similar to the embodiment shown in FIG. 1A, first antenna reflector 220 and third antenna reflector 222 may both be substantially outboard of second antenna reflector 221 and fourth antenna reflector 223. In some other embodiments, first antenna reflector 220 may be outboard of second antenna reflector 221, and third antenna reflector 222 may be inboard of fourth antenna reflector 223.

Referring to FIG. 2B, in the on-orbit configuration, elevator truck 213 may be located at a second position near the end of elevator tower 214 opposite the end which is proximate to the forward surface. First reflector boom 215 and second reflector boom 216 may be at a substantial angle with respect to the position which first reflector boom 215 and second reflector boom 216 are at in the launch configuration. For example, the angle included between first reflector boom 215's launch and on-orbit positions may be an acute angle or, in some configurations, an acute angle between 30° and 80°. The antenna reflector aperture plane of first antenna reflector 220 may be oriented to be substantially parallel to the rotational axis of first pivot 211. The other antenna reflectors may be oriented in a similar manner, although with respect to the appropriate pivot. First antenna reflector 220, second antenna reflector 221, third antenna reflector 222, and fourth antenna reflector 223 may be illuminated by first antenna feed 230, second antenna feed 231, third antenna feed 232, and the fourth antenna feed, respectively. Similarly, boresights for first antenna reflector 220, second antenna reflector 221, third antenna reflector 222, and fourth antenna reflector 223 may be oriented in a first desired beam direction, a second desired beam direction, a third desired beam direction, and a fourth desired beam direction, respectively.

Figure 3A:
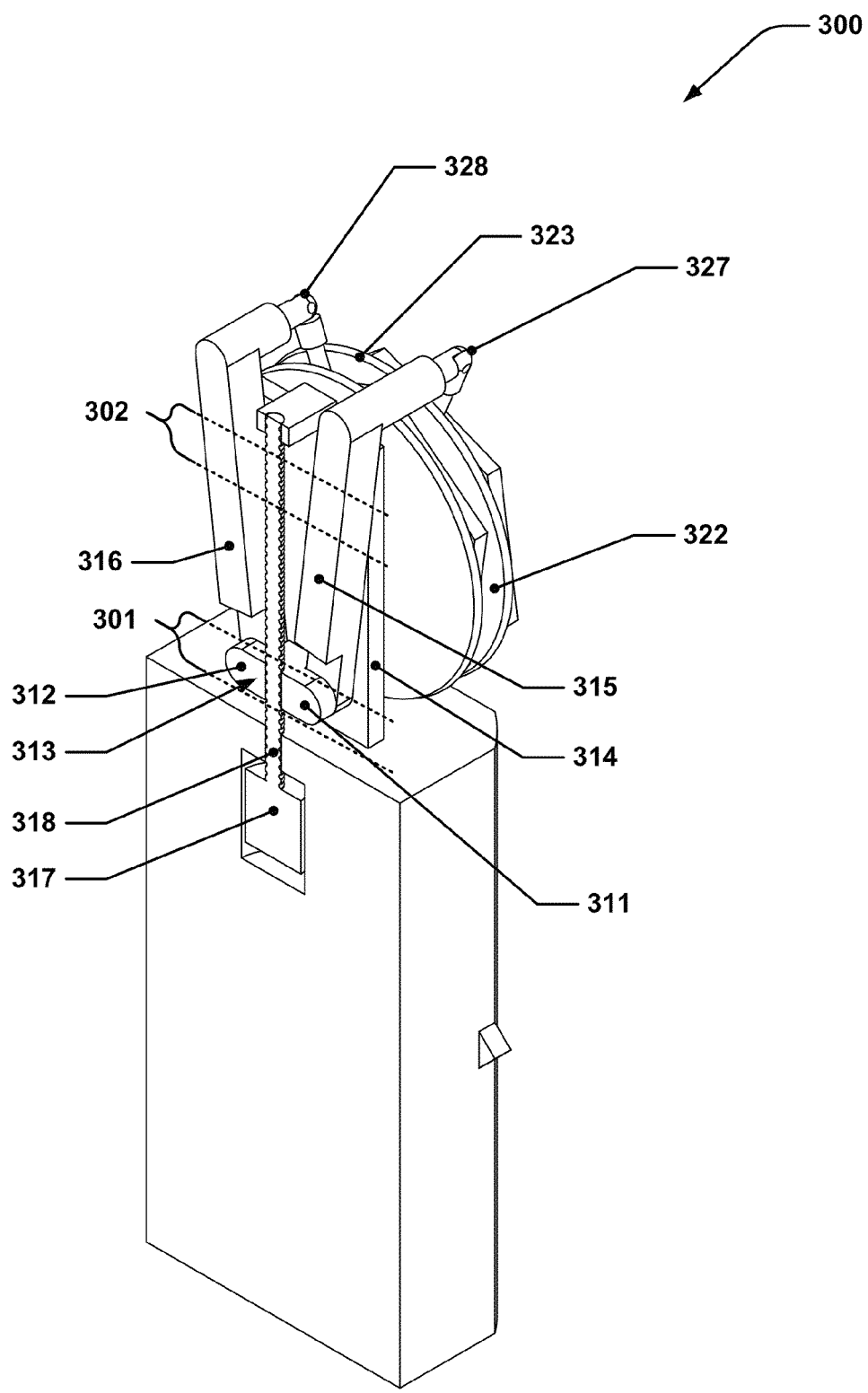
FIG. 3A depicts a simplified isometric cutaway view of the satellite embodiment of FIG. 2A in a launch configuration.
Figure 3B:
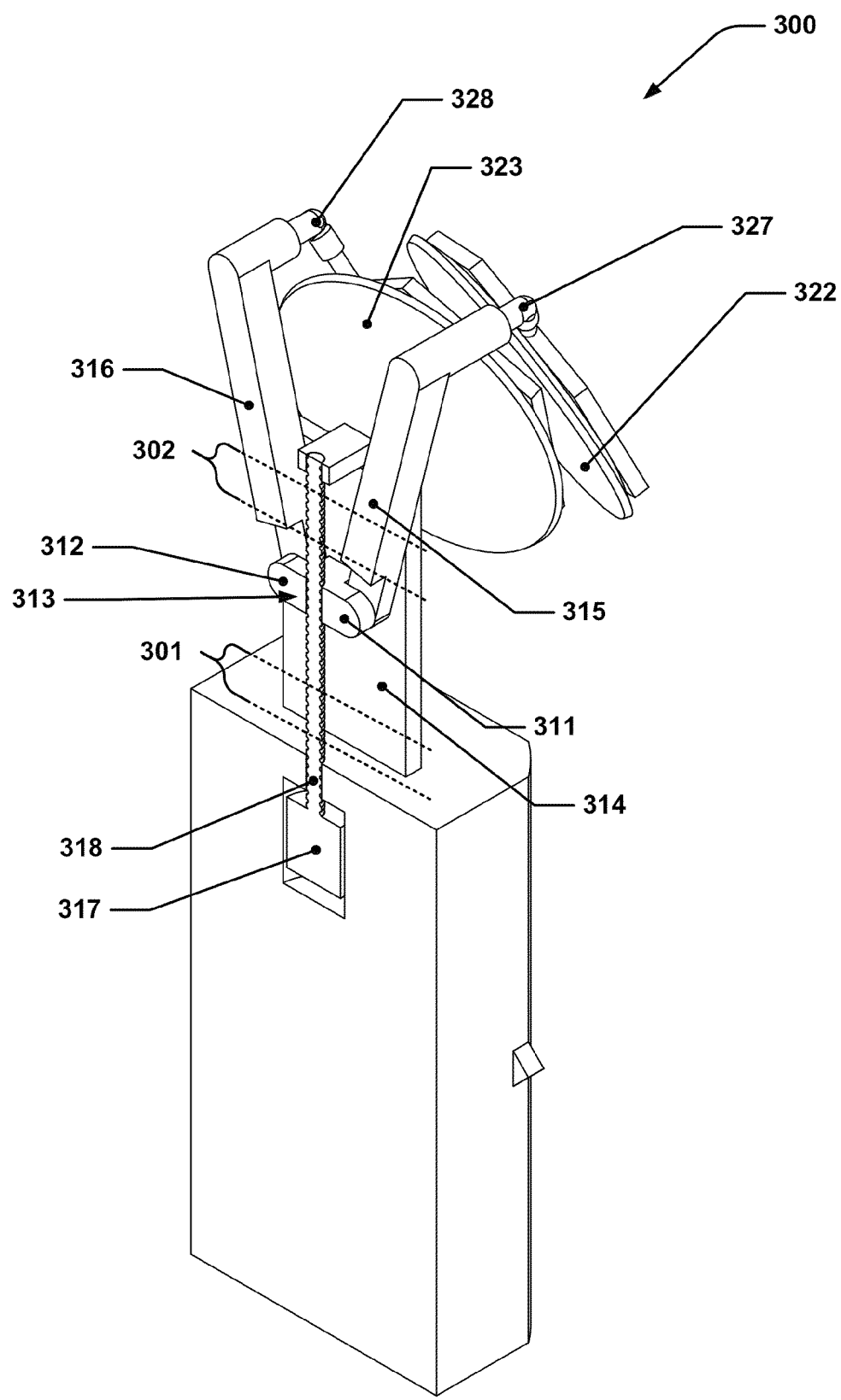
FIG. 3B depicts a simplified isometric cutaway view of the satellite embodiment of FIG. 2A during transition from a launch configuration to an on-orbit configuration.
Figure 3C:
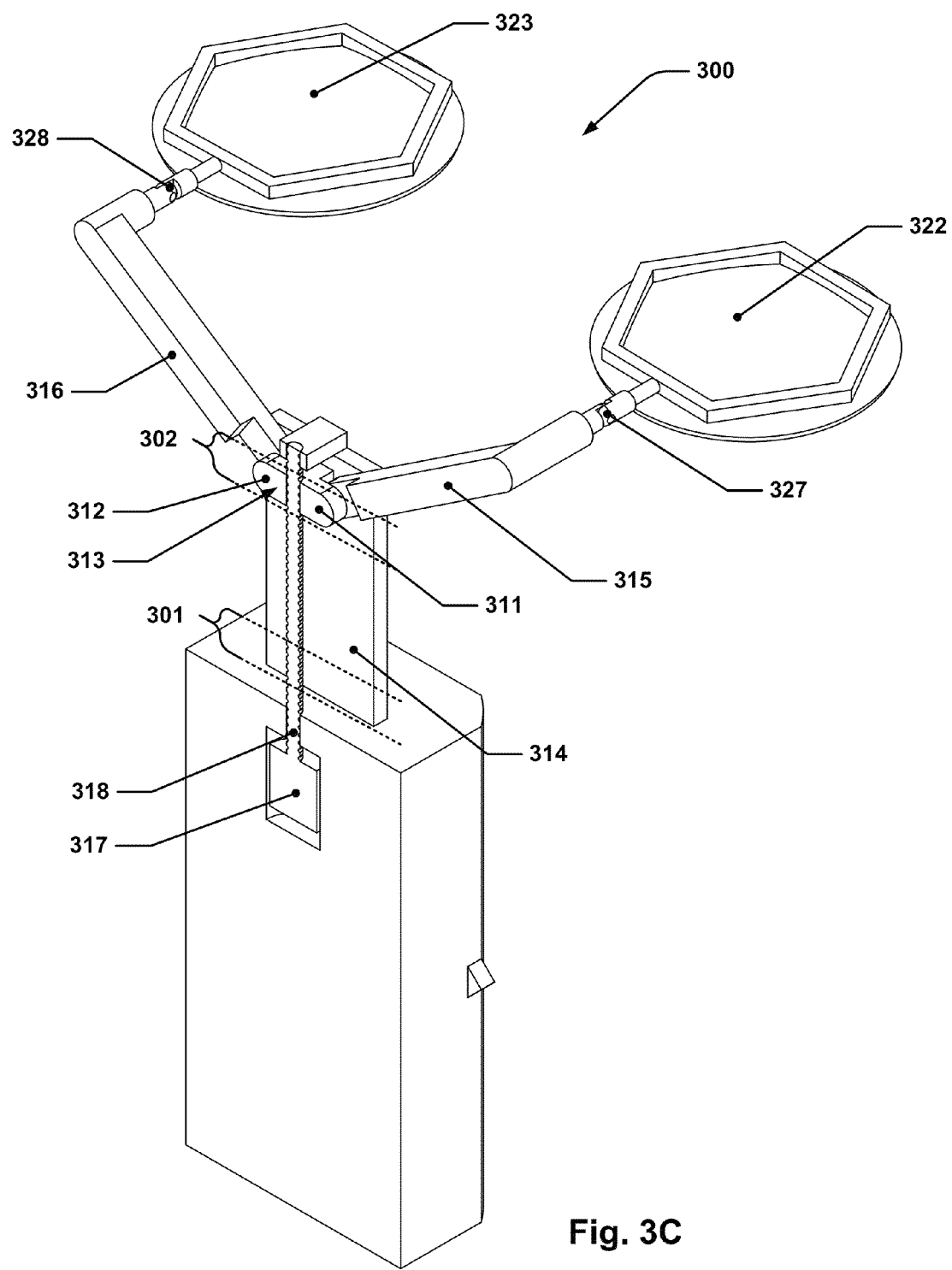
FIG. 3C depicts a simplified isometric cutaway view of the satellite embodiment of FIG. 2A in an on-orbit configuration.

FIGS. 3A-3C depict a cutaway view of an embodiment such as that shown in FIGS. 2A-2H; it is to be understood that structures shown in FIGS. 3A-C corresponding to structures shown in FIGS. 2A-2H may be referred to using the 2XX enumerators of FIGS. 2A-2H or the 3XX enumerators used in FIGS. 3A-C. For consistency, similar components are referred to in these figures using enumerators with the last two digits matching.

FIG. 3A depicts satellite 300 in the launch configuration. Elevator truck 313 is positioned at first end 301 of elevator tower 314, and first reflector boom 315 and second reflector boom 216 are drawn into a stowed position inside elevator tower 314. FIG. 3B depicts satellite 300 at an intermediate stage of deployment. In FIG. 3B, elevator truck 313 has been translated approximately half of the distance between first end 301 and second end 302 using screw actuator 318, which is driven by motor 317. First reflector boom 315 and second reflector boom 316 have rotated about first pivot 311 and second pivot 312, respectively. FIG. 3C depicts satellite 300 in the on-orbit configuration. Elevator truck 313 is positioned at second end 302 of elevator tower 314, and first reflector boom 315 and second reflector boom 316 extend from second end 302 of elevator tower 314 and are both at a substantial angle with respect to the position which each was in the launch configuration.

To transition satellite 300/200 from the launch configuration (FIGS. 2D and 3A) and the on-orbit configuration (FIGS. 2H and 3C), first antenna reflector 220, second antenna reflector 221, third antenna reflector 222, and fourth antenna reflector 223 may be rotated away from the centerline of satellite 200 using first positioning mechanism 225, second positioning mechanism 226, third positioning mechanism 227, and fourth positioning mechanism 228, respectively. Such rotation may be necessary to clear equipment, including the antenna reflectors themselves, which may interfere with the antenna reflectors when first reflector boom 215 is rotated about first pivot 211 or second antenna reflector boom 216 is rotated about the second pivot. Such rotation may be unnecessary if such interference will not occur.

Once the antenna reflectors have been rotated to avoid potential interference issues, elevator truck 213 may be translated from first position 301 to second position 302. As elevator truck 213 translates, each connected reflector boom may rotate with respect to two pivot points. The first point corresponds with the center of rotation of the pivot on elevator truck 213 with which the reflector boom is connected (e.g., element 211 or 217 of FIG. 2C) and translates with elevator truck 213. The second point corresponds with a fixed pivot point (e.g., element 218 or 219 of FIG. 2C) on the elevator tower, and does not translate with elevator truck 213. Each reflector boom, however, may also translate relative to the second point. Such a joint may be implemented using a number of different techniques. In the embodiment shown in FIGS. 2A-I and FIGS. 3A-C, the reflector booms may have slots 203 included on the sides of the boom. Slots 203 may engage with pins protruding from the interior of elevator tower 214. In this manner, for example, first reflector boom 215 may rotate about the engagement pin while also sliding along the boom axis relative to the engagement pin. The engagement pins may provide the first fixed pivot and the second fixed pivot discussed previously. First reflector boom 215 may be rotated about first pivot 211 and into the on-orbit position, and second reflector boom 216 may be rotated about the second pivot into the on-orbit position.

During or after translation of elevator truck 213, first antenna reflector 220 and third antenna reflector 222 may be further rotated by first positioning mechanism 225 and third positioning mechanism 227, respectively, such that the antenna reflector aperture planes of first antenna reflector 220 and third antenna reflector 222 are substantially parallel to the rotational axis of first pivot 211, illuminated by first antenna feed 230 and third antenna feed 232, respectively, and oriented in a first desired beam direction and a third desired beam direction, respectively. Second antenna reflector 221 and fourth antenna reflector 223 may be further rotated by second positioning mechanism 226 and fourth positioning mechanism 228, respectively, such that the antenna reflector aperture planes of second antenna reflector 221 and fourth antenna reflector 223 are substantially parallel to the rotational axis of the second pivot, illuminated by second antenna feed 231 and the fourth antenna feed (not shown), respectively, and oriented in a second desired beam direction and a fourth desired beam direction, respectively.

In some embodiments, some of the rotational steps described above may be combined. For example, the antenna reflectors may initially be rotated such that no or little further rotation is required once the reflector booms are rotated into the on-orbit position. In embodiments where some of the above-described components are missing, corresponding steps need not be performed.

Some embodiments may include additional features. For example, some embodiments may include crossboom 204 which is mounted to the distal end of a reflector boom. Crossboom 204 may be substantially orthogonal to the longitudinal axis of first reflector boom 215 or second reflector boom 216, and may have a positioning mechanism and antenna reflector mounted to each end. The cross boom may be used to space the connected antenna reflectors apart in a direction corresponding with the reflector boom pivot axis. Such a configuration may be used to provide a gap between the antenna reflectors when in the launch configuration which may be occupied by, for example, elevator tower 214, other antenna reflectors, or other equipment. The crossbooms may vary in length between reflector booms or be axially offset with respect to each other.

Figure 4:
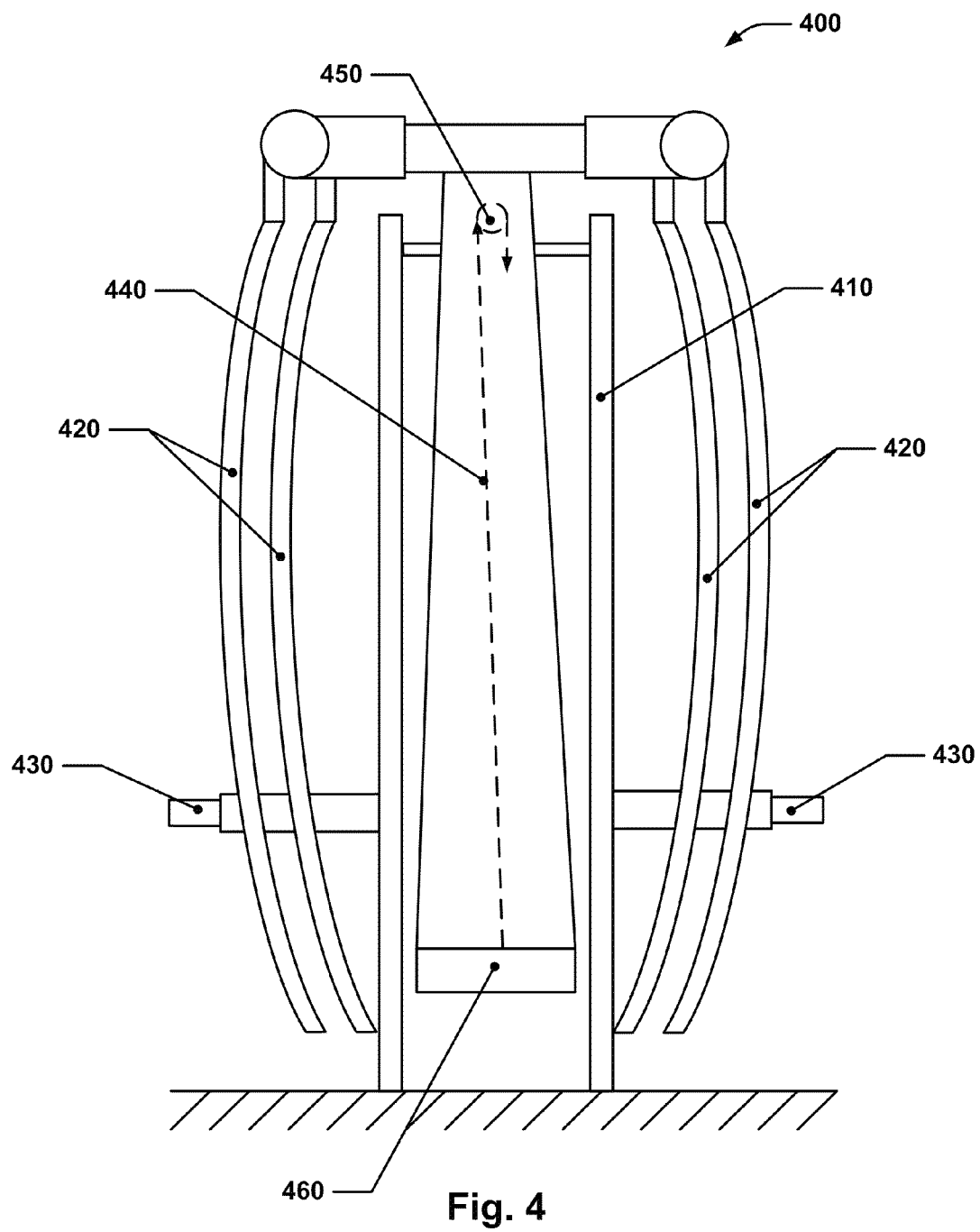
FIG. 4 depicts a simplified side view of a conceptual elevator tower and antenna reflectors in a launch configuration.
Figure 5A:
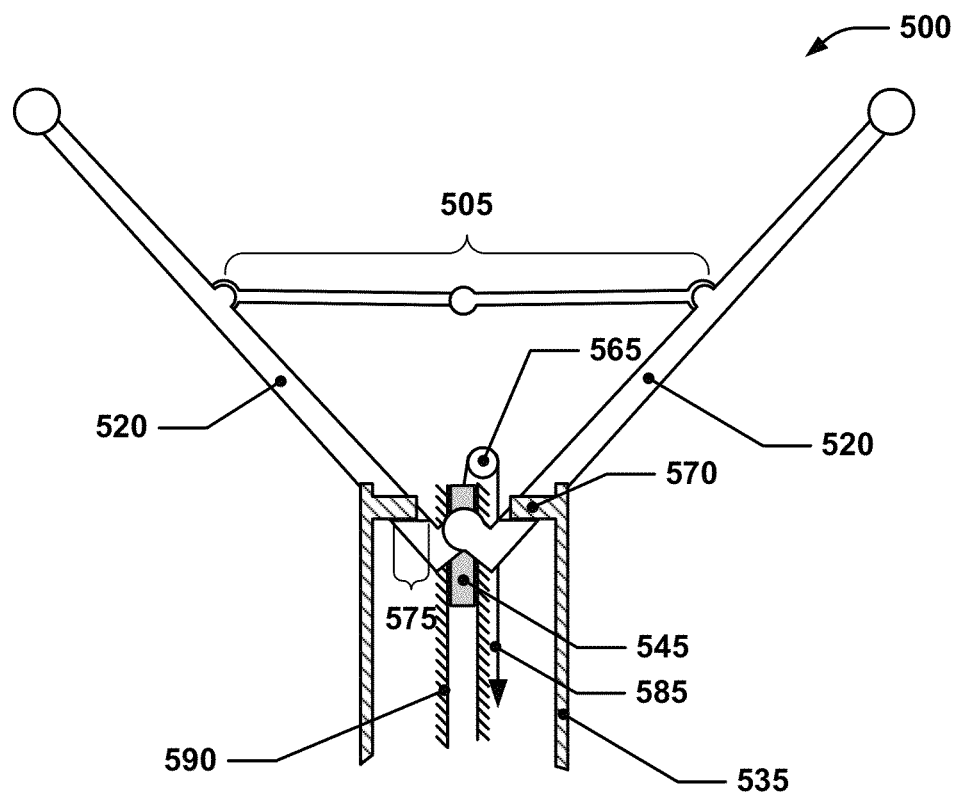
FIG. 5A depicts the top end of a conceptual elevator tower and reflector booms in an on-orbit configuration.
Figure 5B:
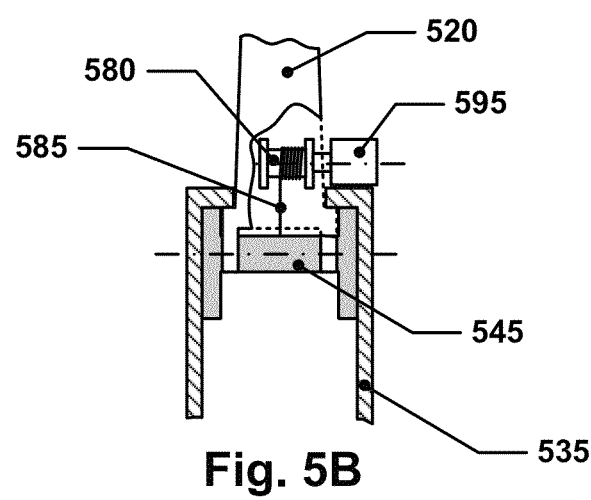
FIG. 5B depicts a conceptual cutaway side view of the top of an elevator tower and a spool drive.

Some embodiments may utilize holddowns to prevent the antenna reflectors from moving during launch environments. FIG. 4 depicts reflector deployment mechanism 400, which includes elevator tower 410 and antenna reflectors 420. Dual-reflector holddowns 430 may be used to secure two antenna reflectors 420 simultaneously. FIG. 4 also depicts a concept wherein elevator truck 460 is translated into the on-orbit configuration position using cable 440, which is pulled over pulley 450. FIGS. 5A and 5B elaborate further on such drive systems.

FIG. 5A depicts the top of antenna reflector deployment mechanism 500. Elevator tower 535 includes guide track 590, which may be used to guide elevator truck 545 during translation from one end of elevator tower 535 to the other end of elevator tower 535. Elevator truck 545 may be connected with cable 585, which is wound over or around drum 565. In FIG. 5A, cable 585 is reeled in by a motorized pulley near the base of elevator tower 535 (not shown). In some embodiments, cable 585 may be unwound from the motorized pulley at the same rate that cable 585 is reeled in to the motorized pulley. In such embodiments, both ends of cable 585 may be connected with elevator truck 545, which allows elevator truck 545 to be translated in either direction by cable 585, i.e., a pull-pull system.

When elevator truck 545 is translated into position near the end of elevator tower 535, reflector booms 520 may be translated with elevator truck 545 and rotated outwards into the on-orbit configuration. Bi-fold strut 505 may be deployed to lock reflector booms 520 into position. Alternatively, or additionally, reflector booms 520 may feature positive stop features 575 which engage with engagement features 570 on elevator tower 535. Tension from cable 585 and engagement between engagement features 570 and positive stop features 575 may act to retain antenna reflector deployment mechanism 500 in the on-orbit configuration.

FIG. 5B depicts a side view of antenna reflector deployment mechanism 500 which is orthogonal to the view in FIG. 5A. In FIG. 5B, cable 585 is wound around motorized spool 580 by motor 595. The system of FIG. 5B may also be configured to be a pull-pull system through the use of a pulley at the base of elevator tower 535.

Some embodiments may include reflector booms linked by a bi-fold strut. The bi-fold strut may be used to provide additional rigidity to the reflector booms when the reflector booms are in the on-orbit configuration, and may also serve to limit the lock the reflector booms in place in the on-orbit configuration. The bi-fold strut may be connected with each reflector boom at some point between the proximate and distal ends. The bi-fold strut may also be used to assist in deploying the reflector boom into the on-orbit position. For example, the bi-fold strut may be spring-biased such that it forces the reflector booms into the on-orbit configuration or such that it presses the reflector booms against a sliding contact point on the elevator tower.

Figure 6:
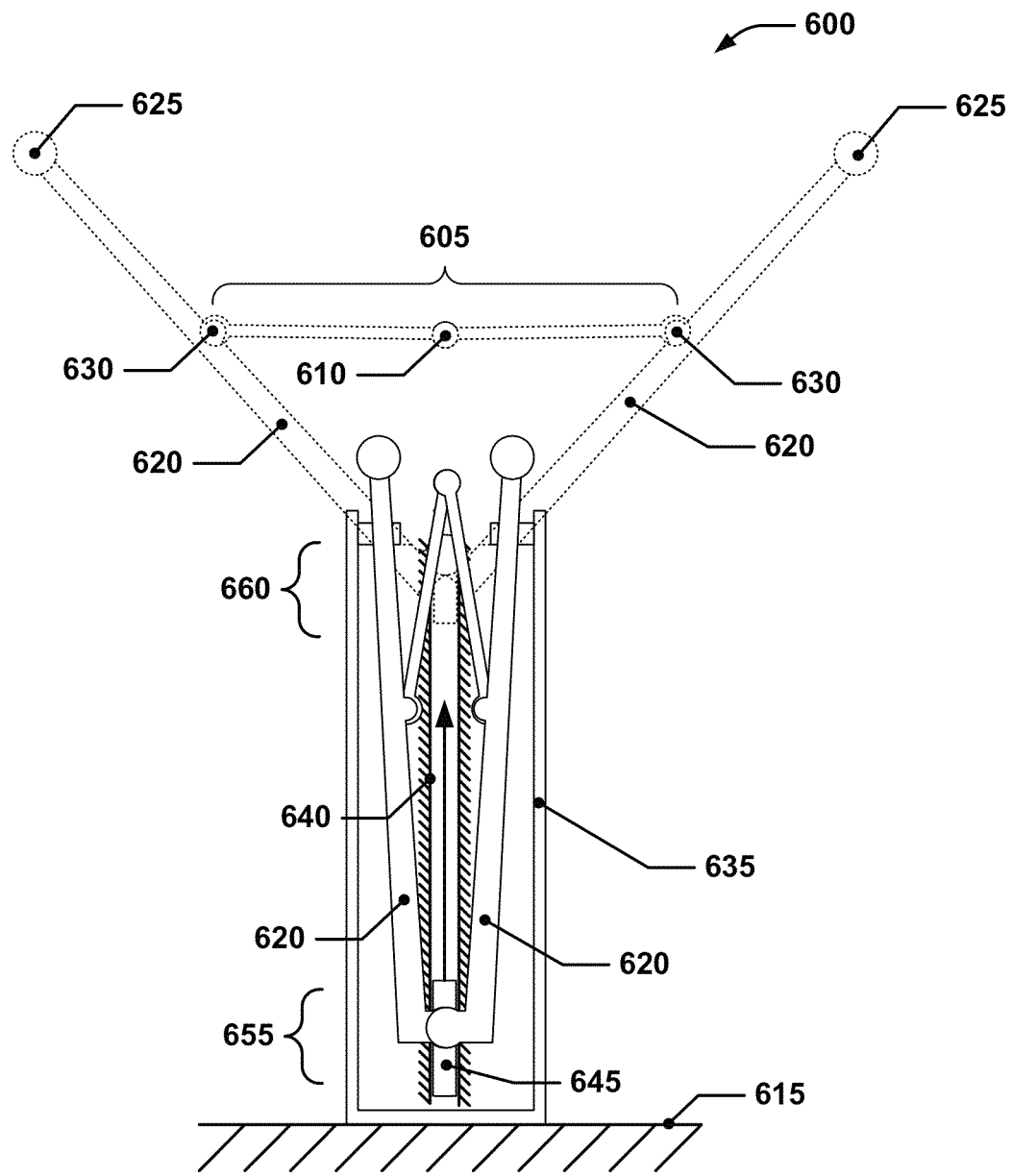
FIG. 6 depicts a simplified side view of a conceptual elevator tower and antenna reflectors in a launch configuration and in an on-orbit location (dotted lines).

FIG. 6 depicts a conceptual side cutaway view of one embodiment of deployment mechanism 600 featuring elevator tower 635 with stiffener strut 605; the configuration shown is the launch configuration, although the on-orbit configuration is shown using dotted outlines of various components as well. Elevator tower 635 may be connected with front surface 615 of a satellite. Elevator tower 635 may contain two reflector booms 620 which are rotatably connected with elevator truck 645 at one end and which each have positioning mechanisms 625 connected at the opposite end. Elevator truck 645 may be translated from first end 655 to second end 660 to place reflector booms 620 in the on-orbit configuration. Elevator truck may be guided during translation using guide track 640. As reflector booms 620 translate with elevator truck 645, reflector booms 620 rotate about pivots on elevator truck 645 and swing open into the deployed configuration. As reflector booms 620 swing open, stiffener strut 605, which is a bi-fold strut in this example embodiment, swings open as well about pivot 610. Each arm 605 of stiffener strut 605 is connected with a reflector boom 620 via pivot 630. When stiffener strut 605 and reflector booms 620 are fully extended into the on-orbit configuration, stiffener strut 605 may lock in place.

As mentioned, the reflector boom may be driven into the on-orbit position through a biasing mechanism on a stiffener strut. In some embodiments, however, the reflector boom may be driven into the on-orbit position by a spring drive associated with a reflector boom pivot or by a motorized actuator. As discussed with reference to FIGS. 5A-5C, a screw drive may be used to translate the elevator truck along the length of the elevator tower. The screw drive may utilize a ball screw or other linear actuator which translates rotary motion into linear motion along the rotational axis. Another drive mechanism may be a cable drive, as discussed with respect to FIGS. 5A and 5B. Yet another drive mechanism may be a rack and pinion drive. Other linear drive systems may be used as well, as appropriate.

Figure 7:
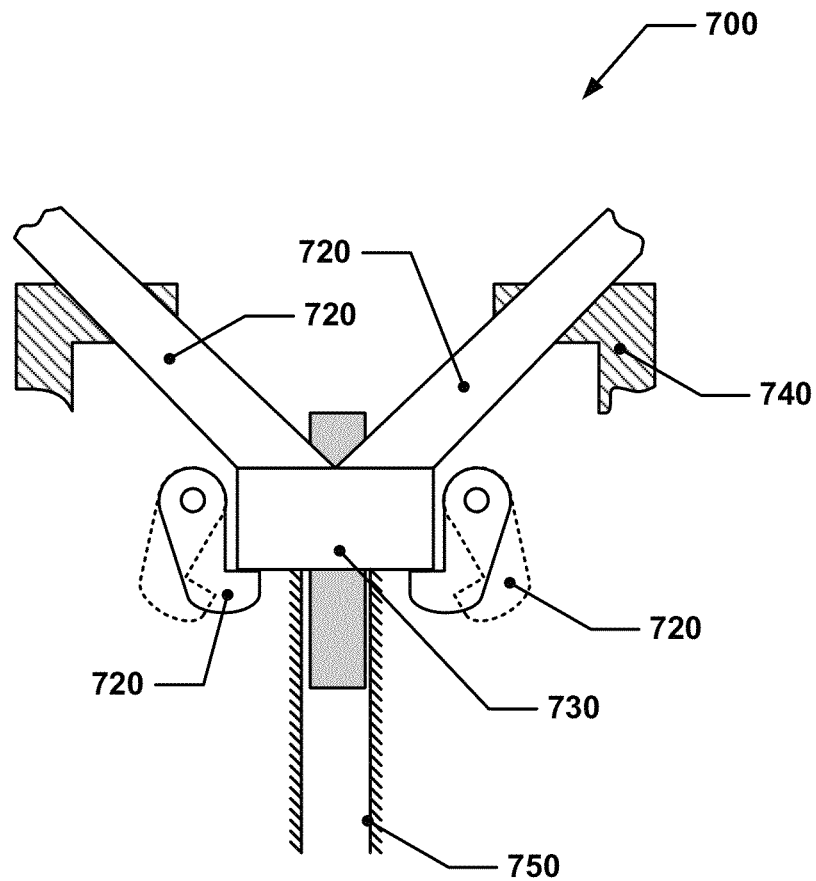
FIG. 7 depicts a latch system and elevator truck.

Some embodiments may feature retaining latches, such as retaining latches 720 in FIG. 7. Elevator tower 740 may include retaining latches 720 (dotted outlines depict latches 720 in the open position), which may be configured to rotate or move such that elevator truck 730 may translate along elevator track 750 and into position for the on-orbit configuration. Reflector booms 720 may rotate out while elevator truck 730 translates along elevator track 750 and may be kept spread apart by a stiffener strut, positive stops, or other means (not shown). Latches 720 may be spring-driven or actuated by other means, such as motors, pyrotechnic devices, or other devices.

Although several embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

I claim:

1. A spacecraft, the spacecraft being reconfigurable between a launch configuration and an on-orbit configuration, the spacecraft comprising:
    a forward surface;
    an aft surface;
    a main body disposed between the forward surface and the aft surface;
    a first rigid antenna reflector, wherein the first rigid antenna reflector is:
        (i) disposed, in the launch configuration, in a first position forward of the forward surface, and
        (ii) disposed, in the on-orbit configuration, a first distance outboard of the main body and a second distance forward of the first position, the first distance and the second distance being substantially orthogonal to one another;
    a first antenna feed associated with the first rigid antenna reflector;
    a mechanism configured to move the first rigid antenna reflector between the launch configuration and the on-orbit configuration, wherein the mechanism comprises:
        an elevator tower disposed with a first end proximate to the forward surface and a second end substantially forward of the main body; and
        an elevator truck, wherein the elevator truck is configured to translate a first pivot along the elevator tower from a first position at the first end of the elevator tower to a second position at the second end of the elevator tower, wherein translation of the elevator truck along the elevator tower causes the first rigid antenna reflector to move between the launch configuration and the on-orbit configuration
    a first reflector boom having a first proximal end and a first distal end located along a longitudinal axis, the first proximal end coupled with the elevator truck via the first pivot and the first distal end coupled with the first rigid antenna reflector, wherein,
        in the on-orbit configuration, the elevator truck is in the second position, the first reflector boom is extended away from the elevator tower and rotated about the first pivot, and the first rigid antenna reflector is illuminated by the first antenna feed.

2. The spacecraft of claim 1, wherein, in the launch configuration, the aperture plane of the first rigid antenna reflector is substantially normal to the rotational axis of the first pivot.

3. The spacecraft of claim 1, further comprising a drive mechanism configured to move the elevator truck between the first position and the second position.

4. The spacecraft of claim 1, further comprising an elevator track, wherein:
    the elevator track spans between the first position and the second position, and
    the elevator track is configured to guide the elevator truck during translation of the elevator truck between the first position and the second position.

5. The spacecraft of claim 1, wherein:
    the elevator tower includes a first fixed pivot point, the first fixed pivot point being engaged with the first reflector boom so as to permit rotation of the boom about the first fixed pivot point and to permit translation of the first reflector boom with respect to the first fixed pivot point along the longitudinal axis of the first reflector boom, and
    the mechanism is configured such that translation of the elevator truck simultaneously rotates the first reflector boom about the first pivot and the first fixed pivot point and translates the first reflector boom, with respect to the first fixed pivot point, along the longitudinal axis.

6. The spacecraft of claim 3, wherein the drive mechanism is coupled with a motor and selected from the group consisting of a ball or lead screw, a cable and drum, or a rack and pinion.

7. The spacecraft of claim 1, further comprising at least one latch movable between a first latch position and a second latch position, wherein:
    the at least one latch prevents the elevator truck from moving from the second position when the elevator truck is in the second position and the at least one latch is in the first latch position, and
    the at least one latch does not prevent the elevator truck from moving from or to the second position when the at least one latch is in the second latch position.

8. The spacecraft of claim 1, wherein the first antenna feed is located approximately midway between the forward surface and the aft surface.

9. The spacecraft of claim 1, wherein the first reflector boom deploys to the east side of the spacecraft with respect to the orientation of the spacecraft when in normal operational orbit.

10. The spacecraft of claim 1, wherein the first reflector boom deploys to the north side of the spacecraft with respect to the orientation of the spacecraft when in normal operational orbit.

11. The spacecraft of claim 1, wherein the mechanism further comprises:
    a first positioning mechanism coupled with the first rigid antenna reflector, wherein:
        the first distal end of the first reflector boom is coupled with the first rigid antenna reflector via the first positioning mechanism; and
        in the launch configuration, the elevator truck is in the first position, the first reflector boom is drawn into a stowed position, the aperture plane of the first rigid antenna reflector is substantially parallel to the spacecraft yaw axis, and a substantial portion of the first rigid antenna reflector is forward of the forward surface and inboard of the main body.

12. The spacecraft of claim 11, wherein the first positioning mechanism is configured to provide dual-axis rotation.

13. The spacecraft of claim 11, further comprising:
a second rigid antenna reflector, wherein the second rigid antenna reflector is:
(i) disposed, in the launch configuration, in a second position forward of the forward surface, and
(ii) disposed, in the on-orbit configuration, a third distance outboard of the main body and a fourth distance forward of the second position, the third distance and the fourth distance being substantially orthogonal to one another; and
a second antenna feed associated with the second rigid antenna reflector; and wherein the mechanism further comprises:
a second positioning mechanism coupled with the second rigid antenna reflector;
a second reflector boom having a second proximal end and a second distal end, the second proximal end coupled with the elevator truck via a second pivot, wherein the second pivot translates with the elevator truck, and the second distal end coupled with the second rigid antenna reflector via the second positioning mechanism, wherein:
in the launch configuration, the second reflector boom is drawn into the stowed position, the aperture plane of the second rigid antenna reflector is substantially parallel to the spacecraft yaw axis, and a substantial portion of the second rigid antenna reflector is forward of the forward surface and inboard of the main body, and
in the on-orbit configuration, the second reflector boom is extended away from the elevator tower and rotated about the second pivot, and the first rigid antenna reflector is illuminated by the second antenna feed.

14. The spacecraft of claim 13, wherein:
the first reflector boom is coupled with the second reflector boom with a bi-fold strut,
the bi-fold strut is coupled with the first reflector boom between the first proximal end and the first distal end, and
the bi-fold strut is coupled with the second reflector boom between the second proximal end and the second distal end.

15. The spacecraft of claim 13, further comprising:
a third rigid antenna reflector, wherein the third rigid antenna reflector is:
(i) disposed, in the launch configuration, in a third position forward of the forward surface, and
(ii) disposed, in the on-orbit configuration, a fifth distance outboard of the main body and a sixth distance forward of the third position, the fifth distance and the sixth distance being substantially orthogonal to one another;
a third antenna feed associated with the third rigid antenna reflector;
a fourth rigid antenna reflector, wherein the fourth rigid antenna reflector is:
(i) disposed, in the launch configuration, in a fourth position forward of the forward surface, and
(ii) disposed, in the on-orbit configuration, a seventh distance outboard of the main body and an eighth distance forward of the fourth position, the seventh distance and the eighth distance being substantially orthogonal to one another;
a fourth antenna feed associated with the fourth rigid antenna reflector; and wherein the mechanism further comprises:
a third positioning mechanism coupled with the third rigid antenna reflector and to the first distal end; and
a fourth positioning mechanism coupled with the fourth rigid antenna reflector and the second distal end, wherein:
in the launch configuration, the aperture planes of the third rigid antenna reflector and the fourth rigid antenna reflector are substantially parallel to the spacecraft yaw axis, and the third rigid antenna reflector and the fourth rigid antenna reflector are forward of the forward surface and inboard of the main body, and
in the on-orbit configuration, the third rigid antenna reflector and the fourth rigid antenna reflector are illuminated by the third antenna feed and fourth antenna feed, respectively.

16. The spacecraft of claim 15, further comprising:
a first crossboom, the first crossboom coupled with the first positioning mechanism at a first end of the first crossboom, the first crossboom coupled with the third positioning mechanism at a second end of the first crossboom, and the first crossboom coupled with the first distal end between the first end and the second end of the first crossboom, wherein the first rigid antenna reflector and the third rigid antenna reflector are coupled with the first reflector boom via the first crossboom; and
a second crossboom, the second crossboom coupled with the second positioning mechanism at a first end of the second crossboom, the second crossboom coupled with the fourth positioning mechanism at a second end of the second crossboom, and the second crossboom coupled with the second distal end between the first end and the second end of the second crossboom, wherein the second rigid antenna reflector and the fourth rigid antenna reflector are coupled with the second reflector boom via the second crossboom.

17. An antenna reflector deployment mechanism for a spacecraft, the antenna reflector deployment mechanism being reconfigurable between a launch configuration and an on-orbit configuration, configured to be mounted to a forward surface of a main body of the spacecraft, and comprising:
an elevator tower, wherein the elevator tower is configured to be disposed with a first end proximate to the forward surface and a second end further away from the forward surface of the spacecraft;
an elevator truck, wherein the elevator truck is configured to translate a first pivot along the elevator tower from a first position at the first end of the elevator tower to a second position at the second end of the elevator tower;
a first rigid antenna reflector;
a first reflector boom having a first proximal end and a first distal end, the first proximal end coupled with the elevator truck via the first pivot and the first distal end coupled with the first rigid antenna reflector,
wherein, in the on-orbit configuration, the elevator truck is in the second position, the first reflector boom is extended away from the second end of the elevator tower at a substantial angle with respect to the elevator tower, and the aperture plane of the first rigid antenna reflector is substantially parallel to the rotational axis of the first pivot, and wherein the first rigid antenna reflector is:
- disposed, in the launch configuration, in a first position forward of the forward surface, and
- disposed, in the on-orbit configuration, a first distance outboard of the main body and a second distance forward of the first position, the first distance and the second distance being substantially orthogonal to one another, and
- translation of the elevator truck along the elevator tower causes the first rigid antenna reflector to move between the launch configuration and the on-orbit configuration.

18. The antenna reflector deployment mechanism of claim 17, wherein the first rigid antenna reflector is characterized by a focal length, the focal length being no less than the axial length of the main body along the yaw axis.

19. The antenna reflector deployment mechanism of claim 17, further comprising:
a first positioning mechanism configured to be coupled with the first rigid antenna reflector, wherein:
- the first rigid antenna reflector is coupled with the first distal end via the first positioning mechanism;
- in the launch configuration, the elevator truck is in the first position, the first reflector boom is drawn into a stowed position, the aperture plane of the first rigid antenna reflector is substantially parallel to the elevator tower, and a substantial portion of the first rigid antenna reflector is between the first end and the second end of the elevator tower; and
- in the on-orbit configuration, the aperture plane of the first rigid antenna reflector is substantially parallel to the rotational axis of the first pivot, and the first rigid antenna reflector is illuminated by the first antenna feed.

20. The antenna reflector deployment mechanism of claim 19, wherein, in the launch configuration, the aperture plane of the first rigid antenna reflector is substantially normal to the rotational axis of the first pivot.

21. The antenna reflector deployment mechanism of claim 19, wherein:
- the elevator tower includes a first fixed pivot point, the first fixed pivot point being engaged with the first reflector boom so as to permit rotation of the boom about the first fixed pivot point and to permit translation of the boom with respect to the first fixed pivot point along the longitudinal axis of the boom;
- the mechanism is configured such that translation of the elevator truck simultaneously rotates the first reflector boom about the first pivot and the first fixed pivot and translates the first reflector boom, with respect to the first fixed pivot point, along the longitudinal axis.

22. The antenna reflector deployment mechanism of claim 19, wherein the first positioning mechanism is configured to provide dual-axis rotation.

23. The antenna reflector deployment mechanism of claim 19, further comprising:
a second rigid antenna reflector;
a second positioning mechanism configured to be coupled with the second rigid antenna reflector; and
a second reflector boom having a second proximal end and a second distal end, the second proximal end coupled with the elevator truck via a second pivot and the second distal end coupled with the second rigid antenna reflector via the second positioning mechanism, wherein:
- in the launch configuration, the second reflector boom is drawn into a stowed position, the aperture plane of the second rigid antenna reflector is substantially parallel to the elevator tower, and a substantial portion of the second rigid antenna reflector is between the first end and the second end of the elevator tower,
- in the on-orbit configuration, the second reflector boom is extended away from the second end of the elevator tower at a substantial angle with respect to the elevator tower, and the aperture lane of the second rigid antenna reflector is substantially parallel to the rotational axis of the first pivot, and
- the second rigid antenna reflector is:
  - disposed, in the launch configuration, in a second position forward of the forward surface, and
  - disposed, in the on-orbit configuration, a third distance outboard of the main body and a fourth distance forward of the second position, the third distance and the fourth distance being substantially orthogonal to one another.

24. The antenna reflector deployment mechanism of claim 17, further comprising a drive mechanism configured to move the elevator truck between the first position and the second position.

25. The antenna reflector deployment mechanism of claim 17, further comprising an elevator track, wherein:
- the elevator track spans between the first position and the second position, and
- the elevator track is configured to guide the elevator truck during translation of the elevator truck between the first position and the second position.

26. The antenna reflector deployment mechanism of claim 24, wherein the drive mechanism is coupled with a motor and selected from the group consisting of a ball or lead screw, a cable and drum, or a rack and pinion.

27. The antenna reflector deployment mechanism of claim 17, further comprising at least one latch movable between a first latch position and a second latch position, wherein:
- the at least one latch prevents the elevator truck from moving from the second position when the elevator truck is in the second position and the at least one latch is in the first latch position, and
- the at least one latch does not prevent the elevator truck from moving from or to the second position when the at least one latch is in the second latch position.

28. The antenna reflector deployment mechanism of claim 23, wherein:
- the first reflector boom is coupled with the second reflector boom with a bi-fold strut,
- the bi-fold strut is coupled with the first reflector boom between the first proximal end and the first distal end, and
- the bi-fold strut is coupled with the second reflector boom between the second proximal end and the second distal end, wherein the bi-fold strut is configured to:
  - unfold as the antenna reflector deployment mechanism is reconfigured from the launch configuration to the on-orbit configuration, and
  - stiffen the first reflector boom and the second reflector boom when the antenna reflector deployment mechanism is in the on-orbit configuration.

29. The antenna reflector deployment mechanism of claim 23, further comprising:
a third rigid antenna reflector;
a fourth rigid antenna reflector;
a third positioning mechanism configured to be coupled with the third rigid antenna reflector and to the first distal end; and a fourth positioning mechanism configured to be coupled with the fourth rigid antenna reflector and the second distal end, wherein:
  in the launch configuration, the aperture planes of the third rigid antenna reflector and the fourth rigid antenna reflector are substantially parallel to the elevator tower, and a substantial portion of the third rigid antenna reflector and a substantial portion of the fourth rigid antenna reflector are between the first end and the second end of the elevator tower,
  in the on-orbit configuration, the aperture planes of the third rigid antenna reflector and the fourth rigid antenna reflector are substantially parallel to the rotation axis of the first pivot rotational axis and the second pivot rotational axis, respectively,
  the third rigid antenna reflector is:
    disposed, in the launch configuration, in a third position forward of the forward surface, and
    disposed, in the on-orbit configuration, a fifth distance outboard of the main body and a sixth distance forward of the third position, the fifth distance and the sixth distance being substantially orthogonal to one another, and
  the fourth rigid antenna reflector is:
    disposed, in the launch configuration, in a fourth position forward of the forward surface, and
    disposed, in the on-orbit configuration, a seventh distance outboard of the main body and an eighth distance forward of the fourth position, the seventh distance and the eighth distance being substantially orthogonal to one another.

30. The antenna reflector deployment mechanism of claim 29, further comprising:
  a first crossboom, the first crossboom coupled with the first positioning mechanism at a first end of the first crossboom, the first crossboom coupled with the third positioning mechanism at a second end of the first crossboom, and the first crossboom coupled with the first distal end between the first end and the second end of the first crossboom, wherein the first rigid antenna reflector and the third rigid antenna reflector are coupled with the first reflector boom via the first crossboom; and
  a second crossboom, the second crossboom coupled with the second positioning mechanism at a first end of the second crossboom, the second crossboom coupled with the fourth positioning mechanism at a second end of the second crossboom, and the second crossboom coupled with the second distal end between the first end and the second end of the second crossboom, wherein the second rigid antenna reflector and the fourth rigid antenna reflector are coupled with the second reflector boom via the second crossboom.

* * * * *